United States Patent
Okita et al.

[11] Patent Number: 6,071,358
[45] Date of Patent: Jun. 6, 2000

[54] ROLLING MEMBER AND ROLLING DEVICE COMPRISING THE SAME

[75] Inventors: Shigeru Okita; Susumu Tanaka; Manabu Ohori; Koji Ueda; Akihiro Kiuchi, all of Kanagawa, Japan

[73] Assignee: NSK Ltd., Tokyo, Japan

[21] Appl. No.: 08/933,966

[22] Filed: Sep. 19, 1997

[30] Foreign Application Priority Data

Sep. 19, 1996 [JP] Japan .................................. 8-248279
Jun. 12, 1997 [JP] Japan .................................. 9-155469
Aug. 21, 1997 [JP] Japan .................................. 9-225255

[51] Int. Cl.$^7$ .............................. C21D 9/36; C22C 38/18
[52] U.S. Cl. ......................... 148/333; 148/906; 420/104
[58] Field of Search ....................... 420/8, 104; 148/320, 148/328, 333, 906

[56] References Cited

U.S. PATENT DOCUMENTS 5,658,082  8/1997  Tsushima et al. .
5,853,660  12/1998  Murakami et al. .................... 420/104

FOREIGN PATENT DOCUMENTS

| 7-103241 | 4/1995 | Japan . |
|---|---|---|
| 8-0004774 | 1/1996 | Japan . |
| 2 294 058 | 4/1996 | United Kingdom . |
| 2 294 270 | 4/1996 | United Kingdom . |
| 2294058 | 4/1996 | United Kingdom . |
| 2294270 | 4/1996 | United Kingdom . |
| 2306506 | 5/1997 | United Kingdom . |

*Primary Examiner*—Scott Kastler
*Attorney, Agent, or Firm*—Sughrue, Mion, Zinn, Macpeak & Seas, PLLC

[57] ABSTRACT

At least one of the components of a rolling member used in a manner in which it is rolled or slid with a mated member is made of carbon steel containing 0.8%–0.9% by weight of C, 0.1%–0.7% by weight of Si, 0.5%–1.1% by weight of Mn, and 0.1%–0.6% by weight of Cr and Fe substantially in the remaining part, wherein an ideal critical diameter DI value calculated from the compositions is 1.5–4.0, and the retained austenite amount after hardened heat treatment is 8%–22% by volume. The value DI is determined by the following equation:

$$DI = (0.311 \times C\%^{0.498}) \times (0.7 \times Si\% + 1) \times (3.33 \times Mn\% + 1) \times (2.16 \times Cr\% + 1)$$

17 Claims, 8 Drawing Sheets

ROLLING ELEMENT STATIC CRUSHING TEST

RING ROTATION BREAKAGE FATIGUE TEST

ROLLING MEMBER AND ROLLING DEVICE COMPRISING THE SAME

BACKGROUND OF THE INVENTION

This invention relates to a rolling device and its components, and in particular relates to an improvement in material for the components of various kinds of rolling devices such as long-life and low-cost rolling bearings made of a bearing steel utilized for automobiles, construction equipment, machine tools, etc., and also rolling devices used as comparatively small-sized precision bearings such as spindle support bearings of a hard disk drive (HDD), a videocassette recorder (VCR), etc., and bearings of a cooling fan motor, etc.

Generally, as well as in the present invention, for example, rolling bearings, ball screws, linear guides, ball bushes, ball splines, etc., are well-known as representative or typical rolling devices. In addition, the following rolling members (of the rolling devices) are well-known.

Races (inner races, outer races) and rolling elements (balls, rolling bearing rolls) are known as components of the rolling bearings. Nuts, screw shaft, and rolling elements (balls) are known as components of the ball screws. Sliders (nuts), guide rails, and rolling elements (balls) are known as components of the linear guides. Bearings, guide races, and rolling elements (balls) are known as components of the ball bushes. Ball bushes, spline shafts, and rolling elements (balls) are known as components of the ball splines.

In the rolling devices, the rolling members are referred/defined as parts/components for making up each rolling device. The rolling member comprises the rolling elements and components rotated, slided or moved relative to the rolling elements for guiding the rolling elements. The rolling elements and the components are referred/defined as mated members relative to each other.

The races and rolling element of a bearing are utilized as components of a rolling bearing which is one example of the rolling devices. The races and rolling element make rolling motion between rolling surfaces and receive a contact stress repeatedly, and also they make sliding motion between a flange portion of each of the races and a rolling element of a roller bearing such as a cage or a component part of a rolling device. For the materials, hardness for resisting against a load, long rolling fatigue strength, good wear resistance to slide, and the like are required. Since the bearings are highly precise mechanical parts in their dimensions, sufficient dimensional stability is required. As the material of the members, generally SUJ2 is used for bearing steel or a steel equivalent to SCR420 is used for case hardening steel.

The loss and gain in using the materials of SUJ2 and SCR420 for rolling bearings are described below:

Since SUJ2 contains much C and Cr in alloy constitution, macro carbide or segregation easily occurs at the steel making time and soaking, etc., is performed to remove it, leading to an increase in the material cost as compared with SCR420.

Generally, inner and outer races for small bearings are molded by hot (warm) forging, then they undergo softening successively; because of the carbon amount of the material, SUJ2 has a high hardness after softening, is hard to cut, and increases the working cost as compared with SCR420. However, SUJ2 is only hardened and tempered to provide hardness required for a bearing; SCR420 is carburized or carbonitrided, then is hardened and tempered to provide hardness required for a surface layer, thus drastically increasing the heat treatment cost as compared with SUJ2. As a result, SUJ2 has a total bearing manufacturing cost lower than SCR420.

However, for the rolling bearing function, the bearing provided by carburizing or carbonitriding SCR420 contains much γR (retained austenite) on the surface layer and a residual compressive stress also occurs, thus the bearing made of SCR420 tends to have a long life particularly under lubrication mixed with foreign material and also show good fatigue strength and impact strength. SCR420 is superior to SUJ2 in dimensional stability of an important function as a bearing.

On the other hand, for the rolling elements, cold wire drawing material, which will be hereinafter called coil material, is used as a material and is molded like a rolling element by cold forging, which will be hereinafter called header working, and cutting is not performed. Comparing cold workability between SUJ2 and SCR420, SUJ2, which contains much C and Cr in alloy constitution, has a high hardness after annealing and is inferior to SCR420 in cold workability. However, SCR420 requires carburizing or carbonitriding, thus increasing the heat treatment cost as with the inner and outer races. As a result, SCR420 increases the manufacturing cost drastically as compared with SUJ2.

For the rolling element function, the rolling element provided by carburizing or carbonitriding SCR420 still contains much γR (retained austenite) on the surface layer and a residual compressive stress also occurs, thus the rolling element made of SCR420 tends to have a long life particularly under lubrication mixed with foreign material.

In contrast, rolling members of spindle support bearings of HDDs and VCRs, air conditioner fan motor bearings, etc., are used under a comparatively light load, but low vibration and sound produced by the bearing itself are required and in some cases, sound degradation during use may become higher than the upper limit of the usage. This means that a good sound characteristic rather than rolling fatigue strength is required for comparatively small precise ball bearings used for these applications.

Vibration and sound are produced by ball bearings for various reasons; they are produced by comparatively small precise ball bearings used for HDDs, etc., because vibration and sound occurring from the bearing raceway surface increases. That is, if the inner and outer race material of a bearing contains a large retained austenite amount, an impression is easily made on the raceway surface of the finished product of the bearing, thus load or impact load easily causes the bearing raceway surface to be deformed permanently. Such permanent deformation increases vibration and sound occurring from the bearing raceway surface, degrading the sound characteristic. Thus, reducing the retained austenite amount (γR) or setting the amount (γR) to zero is effective as a sound degradation countermeasure.

A bearing for which sound characteristic degradation is prevented by reducing or setting to zero the retained austenite amount in the material is disclosed in the Japanese Patent Unexamined Publication No. Hei. 7-103241.

As described above, for the conventional bearing member, case hardening steel which is carburized or carbonitrided has a higher bearing function than bearing steel, but rolling bearings made of bearing steel are often adopted giving cost priority under clean oil bath lubrication or grease lubrication.

However, the conventional rolling member made of bearing steel is high in material cost and also has poor cold workability as described above, and thus it is difficult to meet severe cost reduction demand in recent years. This is a first problem in the prior art.

Further, particularly, external water, etc., easily enters rolling bearings used with machines mainly run outdoors, such as bicycles, automobiles, agricultural machinery, and construction equipment, thus it is known that generally the life of the rolling bearings is shortened ("Jidousha no tripology" Shadan houjin jidousha gijyutukai, 1994. p.272). As its causes, it is known that the lubrication state becomes faulty or damage occurs due to corrosion such as a rust, etc., because water, etc., enters ("Korogari jikuuke handbook" J.Blendline et al., 1996, p.382). To prevent trouble caused by entry of external water, etc., sealing is enhanced for axle bearings and water pump bearings of engine auxiliary machinery for preventing water, etc., from entering.

However, if sealing is enhanced for improving hermeticity, air in the bearing expands and shrinks and water is sucked in because of the temperature difference during the operation and stop of the bearing, thus life lowering caused by water entry cannot perfectly be prevented. To cope with life lowering caused by water entry, high alloy steel such as stainless steel can be used as the bearing material to improve corrosion resistance, but the bearing cost increases. This is a second problem of the prior art.

Furthermore, it is also effective as sound degradation countermeasures to reduce or reduce to zero the retained austenite to cause permanent deformation to easily occur on the bearing raceway surface because of load or impact. However, the conventional reduction method is to perform subzero treatment or tempering treatment at high temperature, thus resulting in the cost equal to or greater than the current cost. This is a third problem in the prior art.

Countermeasures for reducing vibration or sound resulting from the bearing raceway surface are not originally taken; this means that the sound characteristic still has room for improvement.

SUMMARY OF THE INVENTION

It is a first object of the invention to solve the first problem in the prior art and to provide a rolling member having higher performance of life, mechanical strength, etc., than that of the conventional rolling member made of SUJ2 of bearing steel while reducing material and manufacturing costs as much as possible.

According to an experiment of the inventor, the bearing life is not prolonged simply by improving corrosion resistance of inner and outer races; corrosion occurs due to entered water and it is considered that an unknown cause of the bearing damage still exists. Therefore, it is a second object of the invention to solve the second problem in the prior art and to provide a rolling member excellent in endurance life even in an environment wherein corrosion such as a rust, etc., occurs due to entry of water, etc., and which is inexpensive, and a rolling device comprising the rolling member.

Furthermore, it is a third object of the invention to solve the third problem in the prior art and to provide a comparatively small precise rolling member used for an HDD, a VCR, or an air conditioner fan motor, improved in vibration and sound occurring from the bearing raceway surface, and inexpensive, and a rolling device comprising the rolling member.

A first aspect of the present invention will be explained hereinafter.

The inventors have considered reducing the cost of conventional bearing steel and prolonging the life thereof. As a result, they have found that (1) the C, Cr amount is reduced, whereby macro carbides and segregation decrease, soaking treatment can be omitted, and the material cost can be reduced, that (2) the Mn, Si additive amount is also suppressed within a certain threshold value, whereby good cold workability and machinability are provided and the machining cost can also be decreased for accomplishing drastic cost reduction, and that (3) optimum heat treatment is performed, whereby rolling life equal to or greater than that of bearing steel can be provided.

To check whether or not a problem in mass production exists, the inventors have considered forging, cutting, heat treatment, grinding, etc., in actual rolling bearings and have also executed bearing function evaluation. As a result, they have found that (1) if the C, Cr content is decreased for reducing the material and machining costs and a large amount of Mn is added in order to supplement insufficient hardenability, coarsening crystal grains may be promoted for lowering the mechanical strength or a large amount of retained austenite may be produced for lowering dimension stability or strength and that (2) if hardenability is enhanced more than necessary by adding Mn, when the C, Cr content is low (particularly C: 0.8% or less, Cr: 0.1% or less), the suppression effect of coarsening crystal grains decreases and the Ms points lowers, whereby surface tension of transformation stress type at the hardening time increases, so that in rolling elements (particularly rollers), breakage sensibility is raised with an extrusion hole, a chamfer part, etc., at the header working time or a small surface flaw or a non-metal inclusion contained in steel as the starting point, and breakage occurs in the rolling elements of certain size (particularly rollers) or races (particularly races of bearings) or a sufficient fatigue strength characteristic is not provided.

Generally, such breakage is caused by the temperature difference between the surface and the core produced in the cooling process. That is, martensitic transformation develops in the portion in the proximity of the surface earlier arriving at the Ms point in the cooling process, but the core is not transformed and temporarily a compressive stress of heat stress type is received in the proximity of the surface. When the core then becomes martensitically transformed and expands, a surface tensile stress of transformation stress type (residual stress) is received in the proximity of the surface and if the effect is large, the constitution becomes deformed in the proximity of the surface or the material strength does not bear the tensile stress and a minute crack occurs with a complicated form part easily most affected, a surface flaw, or a non-metal inclusion as the starting point, growing to a breakage.

Further, if crystal grains are coarsened due to overheating at the heat treatment time, etc., the breakage sensibility tends to increase. The magnitude of the residual stress changes depending on its alloy composition, form, volume, etc. That is, as the alloy composition increases, the effect of lowering the Ms point is produced, thus the tendency becomes strong (see FIG. 1) and if the volume grows, the absolute expansion amount increases. Further, if the form becomes complicated, the stress is thrown out of balance and a locally large tensile stress occurs with deformation.

For the effect of the volume, however, if the thermal stress becomes larger than the transformation stress or an incomplete hardening phase is produced in the core, sensibility to breakage may lower; it is very difficult to make out the effect of the volume. It is often unavoidable that the bearing form also becomes complicated in design.

Various countermeasures are taken for such a breakage problem caused by the surface tensile stress of transformation stress type accompanying hardening. First, the following preventive countermeasures for breakage are taken on the heat treatment aspect:

(1) Performing mild quenching treatment under control of the hardening oil type and oil temperature;
(2) holding proper temperature after hardening;
(3) performing tempering immediately after hardening;
(4) repeating tempering treatment;
(5) setting the hardening atmosphere to a slight carburizing atmosphere and adding charcoal, thereby giving a residual compressive stress onto the surface; and
(6) for races, performing press quenching treatment to prevent deformation.

However, for mass production, it may be difficult from a cost perspective to change hardening oil, control oil temperature whenever necessary, hold to proper temperature after hardening, or immediately performing tempering in view of problems on lots and facilities. Further, production management is very difficult to execute because the occurrence frequency becomes comparatively high in winter.

Countermeasures with respect to the material aspect are taken by highly purifying steel, namely, reducing non-metal inclusions becoming the occurrence origin point of microcracks, thereby accomplishing improvement in the material aspect. In recent years, the high purifying technologies of the steel manufacturers have been developed remarkably for accomplishing the in-steel oxygen concentration of about 5–7 ppm as a leap upward in the rolling life under clean lubrication. The non-metal inclusions in steel are reduced, whereby the sensibility to breakage also lowers and the heat treatment productivity tends to improve. However, remarkable reduction in the in-steel oxygen level results in a rise in the material cost, which does not meet the object of the invention. Therefore, the inventors have considered not only the material cost or life, but also the breakage sensibility of the material itself viewed from the alloy compositions, and have developed rolling members also good in productivity.

The first object is accomplished by a rolling member of a rolling device, according to the first aspect of the present invention, in which the rolling member is made of carbon steel containing 0.6%–0.9% by weight of C, 0.1%–0.7% by weight of Si, 0.5%–1.1% by weight of Mn, and 0.1%–0.6% by weight of Cr, and Fe and inevitable impurity elements in the remaining part, and the rolling member is subjected to a hardened heat treatment.

In the above-mentioned construction of the rolling member, the retained austenite amount after subjecting to the hardened heat treatment is preferably 22% by volume or less.

Further to the above-mentioned construction of the rolling member, the retained austenite amount after subjecting to the hardened heat treatment is preferably 8% by volume or more.

In the above-mentioned construction of the rolling member, an ideal critical diameter DI value calculated by satisfying the following equation is preferably in the range of 1.5–4.0, where $$DI=(0.311 \times C \%^{0.498}) \times (0.7 \times Si \%+1) \times (3.33 \times Mn \%+1) \times (2.16 \times Cr \%+1).$$

In the above-mentioned construction of the rolling member, the carbon steel preferably contains 0.8%–0.9% by weight of C.

In the above-mentioned construction, an ideal critical diameter DI value calculated by satisfying a following equation is preferably in the range of 1.5–4.0, $DI=(0.311 \times C \%^{0.498}) \times (0.7 \times Si \%+1) \times (3.33 \times Mn \%+1) \times (2.16 \times Cr \%+1)$.

In the above-mentioned construction, the carbon steel preferably contains 0.8%–0.9% by weight of C.

A second aspect of the present invention will be explained hereinafter.

The inventors have made detailed study and analysis of damage conditions occurring on the market for axle bearings of bicycles and automobiles and water pump bearings of engine auxiliary machinery that external water, etc., easily enters, and have discovered the following features:

1) Most of short-life parts that water, etc., enters are fixed outer races.
2) Breakage positions are not only the maximum load position, but also the load zone exit and entrance before and after the maximum load position.
3) Some of rusted outer races are not broken.

The inventors have discovered the following characteristics by assuming the use conditions, carrying out a life experiment with water mixed in a lubricant, and reproducing the damage state on the market:

4) As the amount of water mixed in the lubricant is increased, the short life tendency becomes strong.
5) When corrosion resistance of inner and outer races and rolling elements is enhanced, the life prolonging effect is produced a little.
6) Although corrosion resistance of inner and outer races is enhanced, the life prolonging effect is not produced.
7) When corrosion resistance of inner and outer races is lowered a little with respect to rolling elements, the life prolonging effect is produced.

According to 1)–3), if water, etc., is mixed in the lubricant, flaking occurs in the general load zone of the fixed outer races, thus it is expected that the damage state is not simple fatigue caused by load. Some of the rusted outer races have a long life; it is considered that the damage state is not damage caused by simple corrosion either. Further, if the corrosion resistance of the inner and outer races is lowered a little with respect to the rolling elements, the bearing life prolonging effect is produced. Thus, the effect is produced according to corrosion resistance combination of the inner and outer races and the rolling elements.

To accomplish the second object of the invention, it is important to produce the life prolonging effect although water, etc., is mixed in the lubricant and to reduce costs. From this viewpoint, most of balls of rolling elements of a ball bearing use the SUJ2 material except for some special environment application. The balls are mass-manufactured consecutively by cold working from coil material and the manufacturing cost is reduced to the limit at present. Further, the balls cannot be sculptured or marked, thus they are all manufactured under lot control. That is, even if low-cost material is used to reduce the cost containing workability, process set change and foreign material management costs are added to a large extent and the cost of the balls can be only scarcely reduced. Thus, considering ball bearing cost reduction, SUJ2 is used as the rolling element material even if water, etc., is mixed in the lubricant.

Considering the corrosion resistance combination of the inner and outer races and the rolling elements, the corrosion resistance of the inner and outer races is lowered with respect to the rolling elements, thus it is necessary to decrease Cr most affecting the corrosion resistance from the main compositions of SUJ2. In the invention, Cr of the inner and outer races is decreased and for other compositions, optimum compositions are set considering hardness after hardening required as bearings, hardenability, workability, etc., and are combined with the balls made of SUJ2, thereby providing rolling bearings which are excellent in endurance life even under an environment wherein corrosion such as rust, etc., occurs due to entry of water, etc., and moreover which are inexpensive more than ever.

To accomplish the second object, according to the second aspect of the invention, there is provided a rolling device comprising:

rolling elements of rolling member; and a mated member of the rolling member rolled, slid or moved relative to the rolling elements, in which the mated member is made of carbon steel containing 0.6%–0.9% by weight of C, 0.1%–0.7% by weight of Si, 0.5%–1.1% by weight of Mn, and 0.1%–0.6% by weight of Cr and Fe substantially in the remaining part, and the mated member is subjected to a hardened heat treatment; and the rolling elements of the rolling member are made of an alloy steel containing Cr, and the rolling elements are subjected to a hardened heat treatment, wherein a difference between a matrix Cr content of the mated member and a matrix Cr content of the rolling elements is 0.6% or more.

In the above-mentioned construction of the rolling device, the mating member is preferably made up of 0.8%–0.9% by weight of C, 0.1%–0.5% by weight of Si, 0.5%–1.1% by weight of Mn, and 0.1%–0.6% by weight of Cr, and Fe and inevitable impurity elements in the remaining part, wherein the rolling elements are preferably made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

Further, in the above-mentioned construction of the rolling device, $_M$Cr of the matrix Cr may have the relationship with the Cr, C content and carbide area coefficient Cm as $$_M Cr = Cr\{1 - 28(1+4C) \times Cm/10000\}$$

A third aspect of the present invention will be explained hereinafter.

The inventors have furthermore considered the sound characteristic of ball bearings of comparatively small precise rolling devices used with HDDs, VCRs, air conditioner fan motors, etc.

For the ball bearings used for these applications, vibration and noise still occur as "race sound" from the raceway surface even if defects of accessories such as cages and seals as vibration and noise generation sources are removed by the current excellent working techniques for finishing, and excellent lubrication material is used. The "race sound" is produced by a microswell on the raceway surface, and an exciting force component in the vicinity of the natural frequency of the race, so that the race vibrates, to thereby produces a noise ("Korogari jikuukeno sinndou onkyou" Noda: NSK Technical Journal No. 661, 1996, p15). Circumferential swell at continuous crest height with respect to the number of continuous crests exists on the raceway surface of the races of the ball bearing and the ball surface, and when the ball bearing rotates, vibration occurs and proper vibration of the race is enhanced, producing sound ("Tamajikuukeno souon" Igarashi: Nippon Kikai Gakkai Ronbunshuu Vol. 30, issue 220, 1964, p118). This means that if the "swell" as the vibration source is reduced, the sound characteristic occurring from the bearing raceway surface can be improved. However, under present circumstances, the "race sound" is already reduced to the limit by precise working according to working techniques at a high level and further reduction needs to be considered from aspects other than the working techniques.

Unless special requirements of corrosion resistance, long life, etc., exist, the SUJ2 material is used for the ball bearings and carbides about 1 μm proper to SUJ2 are distributed on the bearing raceway surface of a finished product. The inventors have thought that the carbide distribution proper to the SUJ2 material has an effect as one of the "swell" causes on the races, have examined the sound characteristic by changing the carbide distribution in various ways, and have found the following:

For a ball bearing comprising inner and outer races and rolling elements made of SUJ2, 1) if only the carbide area coefficient of the inner and outer races is made higher than that of SUJ2, vibration increases;

2) if only the carbide area coefficient of the inner and outer races is made lower than that of SUJ2, vibration lessens; and 3) if the carbide area coefficients of the inner and outer races and the rolling elements are made lower than that of SUJ2, vibration lessens, but is the same or worsens a little as compared with the case where only the carbide area coefficient of the inner and outer races is made lower.

The "swells" of the inner and outer races and the rolling elements involved in production of the "race sound" have an irregular nature and produce minute alternating changes in the contact spring force between the inner and outer races and the rolling elements at the rotation time, and forcible vibration is added to the inner and outer races, producing proper vibration, which propagates through air, producing sound ("Korogari jikuukeno onkyou" Igarashi: Jyunkatu, vol. 22, issue 12, 1977, p15).

The inventors have thought that a minute uneven form on the worked finished surface depending on the carbide amount, particularly placement of carbides forming projections rather than simple asperities or coarseness depending on the finished work accuracy on the surface, is involved in the "swell" characteristic of the inner and outer races and the rolling elements and as a result of consideration, have found that vibration added to the contact spring force may decay depending on the combination of the inner and outer races and the rolling elements, namely, the vibration reduction effect is produced depending on the combination of carbide area coefficients in the inner and outer races and the rolling elements.

In view of the third object of the invention to decrease vibration and sound of precise ball bearings of comparatively small rolling devices used for HDD spindles, air conditioner fan motors, etc., for which low vibration and sound produced from the bearings themselves are required, and to reduce the cost, the manufacturing state of the ball bearings is outlined below:

Most of balls of rolling elements of the ball bearing use the SUJ2 material except for some special environment application. The balls are mass-manufactured consecutively by cold working from coil material and the manufacturing cost is reduced to the limit at present. Further, the balls cannot be sculptured or marked, thus are all manufactured under lot control. That is, even if low-cost material is used to reduce the cost containing workability, the cost of the balls can be only scarcely reduced by way of process set change and particularly, foreign material management. Thus, considering ball bearing cost reduction, SUJ2 must be used as the rolling element material even if importance is attached to the sound characteristic.

Therefore, considering the carbide area coefficient combination of the inner and outer races and the rolling elements producing the vibration reduction effect as described above, the carbide area coefficient of the inner and outer races needs to be lowered with respect to the rolling elements, thus it is necessary to decrease C and Cr affecting the carbide area coefficient from the main compositions of SUJ2. To accomplish the third object of the invention, C and Cr of the inner and outer races are decreased and at the same time, for other compositions, optimum compositions are set considering hardness after hardening required as bearings, hardenability, workability, etc., and are combined with the balls made of SUJ2, thereby reducing vibration and sound occurring from the bearing raceway surface and providing bearing devices more inexpensive than the conventional ball bearings.

That is, the third object is accomplished by a rolling device comprising:

rolling elements of rolling member; and a mated member of the rolling member rolled, slid or moved relative to the rolling elements, in which the mated member is made of carbon steel containing 0.6%–0.9% by weight of C, 0.1%–0.7% by weight of Si, 0.5%–1.1% by weight of Mn, and 0.1%–0.6% by weight of Cr, and Fe and inevitable impurity elements in the remaining part, and the mated member is subjected to a hardened heat treatment; and the rolling elements are made of an alloy steel containing Cr, and the rolling elements are subjected to a hardened heat treatment, wherein the retained austenite amount of at least one of the mated member and the rolling elements is not more than 6% by volume.

Further, in the above-mentioned construction of the rolling device, a carbide area coefficient ratio defined by dividing the carbide area coefficient of the mated member by that of the rolling element is preferably not more than 0.9.

The third object may also be accomplished by a rolling device comprising:

rolling elements of rolling member; and a mated member of the rolling member rolled, slid or moved relative to the rolling elements, in which the mated member is made of carbon steel containing 0.6%–0.9% by weight of C, 0.1%–0.7% by weight of Si, 0.5%–1.1% by weight of Mn, and 0.1%–0.6% by weight of Cr, and Fe and inevitable impurity elements in the remaining part, and the mated member is subjected to a hardened heat treatment; and the rolling elements are made of an alloy steel containing Cr, and the rolling elements are subjected to a hardened heat treatment, wherein a carbide area coefficient ratio being defined by dividing the carbide area coefficient of the mated member by that of the rolling element is not more than 0.9.

In the above-mentioned rolling devices, the mating member may be made up of 0.6%–0.9% by weight of C, 0.1%–0.5% by weight of Si, 0.5%–1.1% by weight of Mn, and 0.1%–0.6% by weight of Cr, and Fe and inevitable impurity elements in the remaining part, wherein the rolling elements may be made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

DETAILED DESCRIPTION OF THE PREFERRED EMBODIMENTS

The critical meaning of numeric value limits, etc., according to the first aspect of the present invention will be discussed hereinafter.

First, the reason why the constitution range of the alloy compositions used in the first aspect of the present invention is limited will be discussed.

[C: Content 0.6%–0.9%, preferably Content 0.8%–0.9%, more preferably Content 0.83%–0.9%]

Since bar steel or tubular material is used and hot forging, warm forging, and cutting are performed to manufacture inner and outer races of bearings, the workability of the inner and outer races largely affect the bearing costs. Generally, as the carbon amount of a material is decreased, its workability is improved. However, if the carbon amount is lowered too much, hardness required for the bearing after hardening is not obtained, thus the lower limit is considered to be about 0.6%.

However, the result of detailed study of the use state of ball bearings on the market, carried out by the inventors indicates that most of even ball bearings of grease seal type with a seal generally considered to be for a clean environment, except some "pure clean environments (in this case, the surrounding of a non-metal inclusion at the maximum shearing stress depth position becomes the start point of flaking)", show a fatigue state of surface damage type for the case where corrosion of rust, etc., occurs due to entry of water, etc. Therefore, to provide bearings excellent in endurance life, the bearings must have a sufficient life in an environment in which corrosion of rust, etc., occurs due to entry of water, etc., and also a sufficient life for damage of surface start point type.

Figure 5:
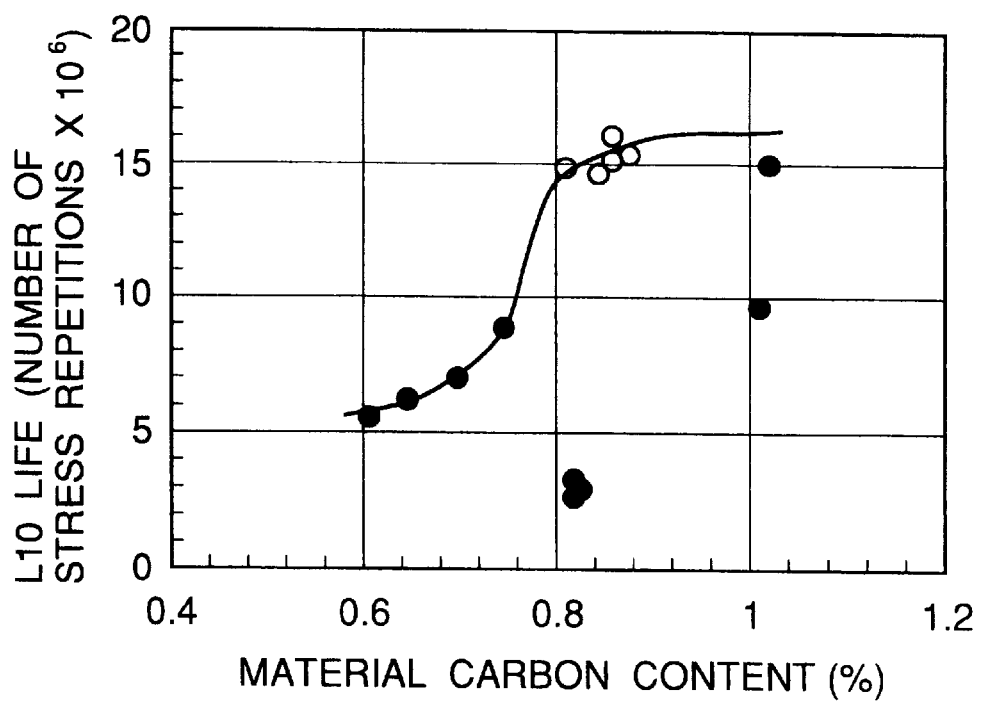
FIG. 5 is a graph to show the life test (material carbon content and life) results under lubrication mixed with a foreign material.

The inventors have examined the bearing life under lubrication mixed with a foreign material to reproduce damage of surface start point type. FIG. 5 shows the examination result. The result clarifies that C % of 0.8% or more (preferably, 0.83% or more) is required to maintain the life from damage of surface start point type. Therefore, the lower limit of C % is set to 0.8%. However, if C % exceeds 0.9%, soaking is required to remove macro carbides and segregation at the steel making time and in addition, deformation resistance increases and cold workability is also lowered, resulting in a rise in cost.

Thus, the carbon content of the material is set to the range of 0.6% to 0.9%, preferably the range of 0.8% to 0.9% and more preferably the range of 0.83% to 0.9%.

[Cr: Content 0.1%–0.6%]

Cr is dissolved in a matrix to enhance hardenability, the resisting property for temper softening, etc., and after annealing, forms minute carbides for preventing crystal grains from being coarsened at the heat treatment time, lowering breakage sensibility and also raising the fatigue strength characteristic and crushing strength. To produce the effect, at least 0.1% or more of Cr is required. However, if 0.6% is exceeded, soaking needs to be performed to improve generation of macro carbides and segregation in the steel making process and the Cr addition cost and material cost rise. As the content of Cr increases, deformation resistance increases and cold workability is lowered as with carbon.

Thus, the Cr content of the material is set to the range of 0.1% to 0.6%.

[Mn: Content 0.5%–1.1%]

Generally, to improve hardenability, Mn or Cr is added. Since Cr is a carbide preparation element, not all added Cr contributes to improvement in the hardenability of a matrix and if the content of Cr is too large, soaking is required, thus Cr cannot much be expected from the viewpoint of the hardenability. Mn is lower in cost than Cr. In order to provide sufficient hardenability in a small Cr amount and paying attention to the fact that Mn is also a retained austenite preparation element effective for the rolling life under lubrication mixed with a foreign material, at least 0.5% or more of Mn is added. However, Mn is also an element enhancing ferrite of material and particularly, if the carbon amount of the material is large (0.7% or more), when the content of Mn exceeds 1.1%, the cold workability is lowered remarkably. Further, if the content of Mn is too large, crystal grains may be coarsened or the retained austenite amount may increase more than necessary, raising the sensibility to breakage or lowering the crush strength. Thus, the Mn amount of the material is set to the range of 0.5% to 1.1%.

[Si: Content 0.1%–0.7%]

Si acts as a deoxidizer at the steel making time of material and is an element effective for improving hardenability like Cr and Mn, enhancing matrix martensite, and prolonging the bearing life. Thus, 0.1% or more, preferably 0.2% or more of Si is added. However, if the content of Si is too large, machinability, forgeability, cold workability are lowered; the upper limit is 0.7% or less, preferably 0.5% or less.

The critical meaning of items other than the constitution range of alloy compositions in the first aspect of the present invention will be hereinafter discussed.

[Ideal critical diameter DI value]

Figure 1:
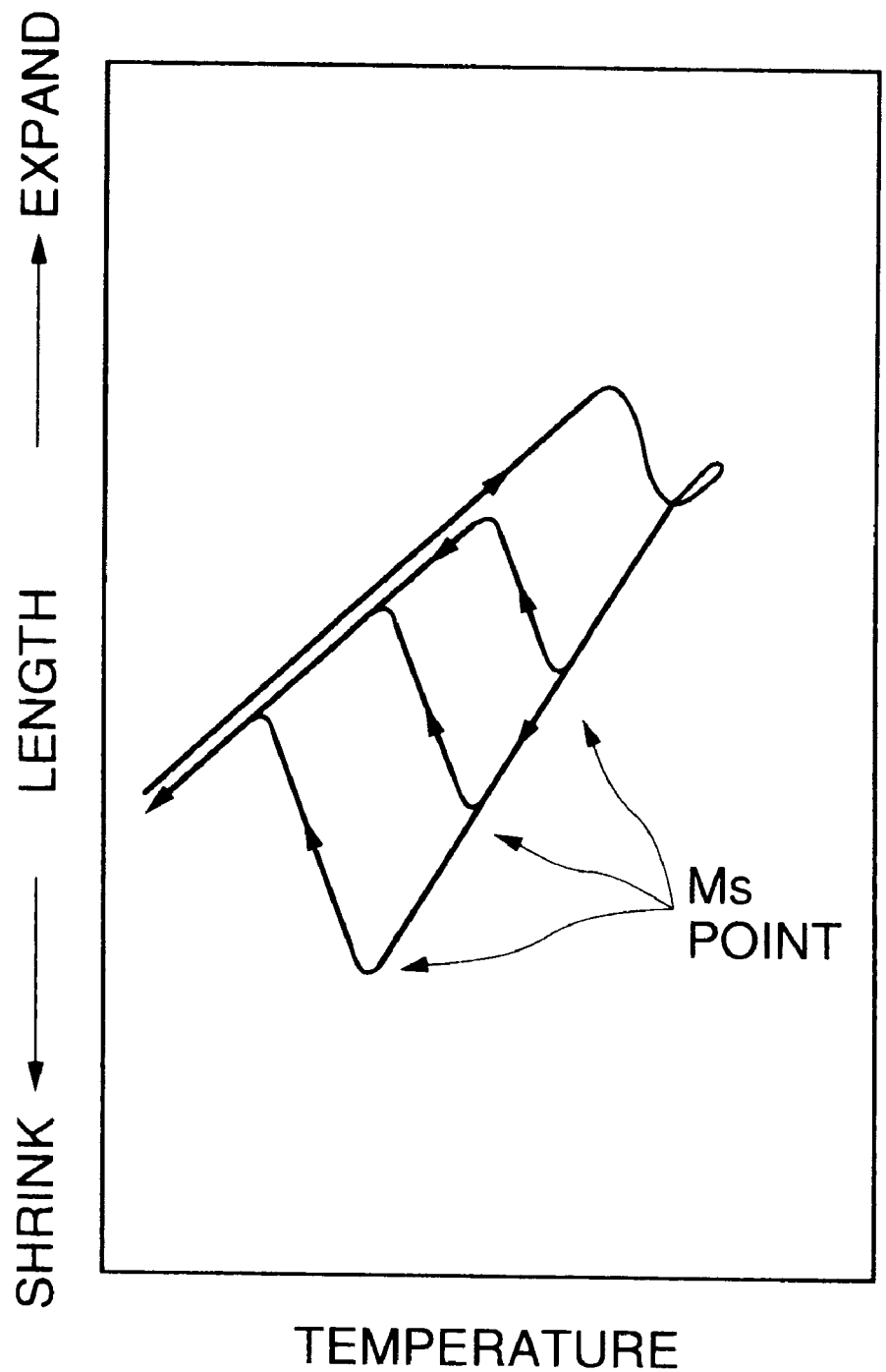
FIG. 1 is a graph representing the effect of Ms point on the transformation expansion amount of steel material.
Figure 2:
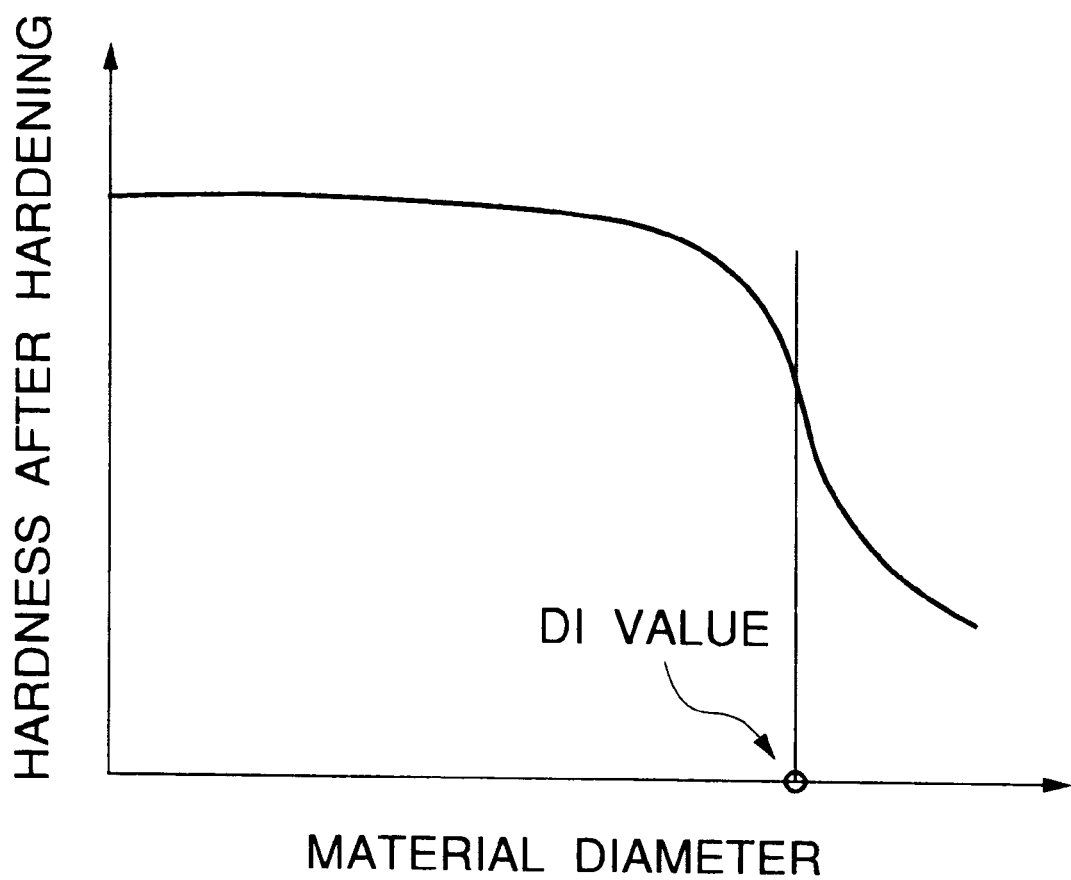
FIG. 2 is a graph to show a DI value in the relationship between material diameter and hardness after hardening.
Figure 3A:
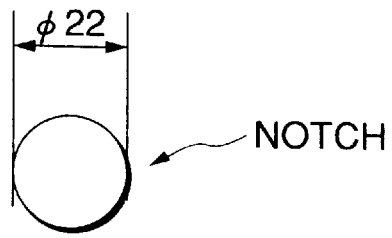
FIG. 3 is an illustration of quench crack test pieces; 3(a) is a plan view of a rolling element test piece, 3(b) is a side view of the rolling element test piece, 3(c) is a plan view of a race test piece, 3(d) is a side view of the race test piece, and 3(e) is a notch part form view.
Figure 3B:
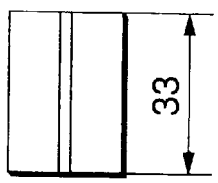
Figure 3C:
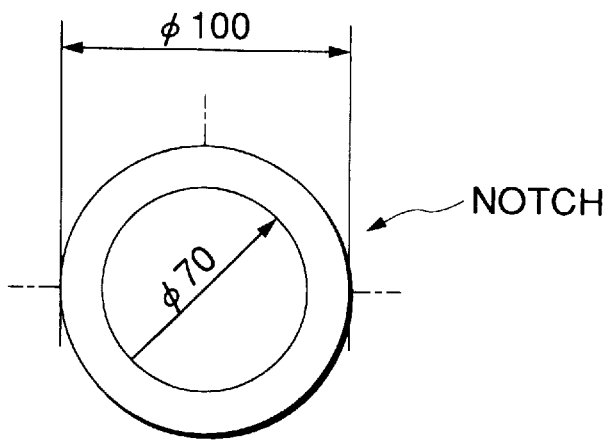
Figure 3D:
Figure 3E:
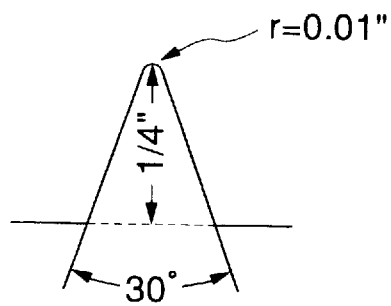

This DI value is one parameter representing hardenability. That is, the relationship between the diameter of material and hardness after hardening is that when the material diameter increases more than reasonable, the hardness lowers abruptly (because incomplete hardening state is entered and the portion not made martensitic increases), as shown in FIG. 2. The DI value indicates the critical value of the diameter. As a material has more excellent hardenability, a larger size can be placed in a complete hardening state (namely, the hardness after hardening can be raised); in other words, the DI value grows. The DI value is defined in various manners by experiments, etc.,; the DI value applied in the invention is defined in AISI (American Iron and Steel Institute) and is represented by expression (1) in inch units:

$$DI=(0.311 \times C\ \%^{0.498}) \times (0.7 \times Si\ \%+1) \times (3.33 \times Mn\ \%+1) \times (2.16 \times Cr\ \%+1) \quad (1)$$

By the way, if each alloy composition of the material in the rolling member satisfies the conditions described above, a problem may occur depending on the combination of the compositions. For example, if the C, Cr content is comparatively small and the Mn content is comparatively large, the crystal grains are easily coarsened and if the hardenability is raised more than necessary, sensibility to breakage is enhanced. Consequently, the rolling element or a race may lead to breakage because of various factors depending on the size or the shape; the productivity may decrease or minute cracks remain in the bearing, lowering the fatigue life.

When the Cr content is comparatively small, if an attempt is made to increase the Mn content for providing hardenability, the retained austenite amount increases and dimensional stability or the mechanical strength may lower, decreasing the bearing function remarkably.

As the content of any of C, Cr, or Mn increases, the element has the effect of lowering workability. Thus, if the contents of C, Cr, and Mn are increased at the same time, workability is impaired inevitably. If the content of C or Cr is increased, macro carbides are easily produced; if the contents of C and Cr are increased at the same time, it becomes necessary to perform soaking.

In the invention, it is clarified that it is also effective to thus limit the amount of each compositions of the rolling member; preferably, it is also necessary to define correlation between the compositions at the same time. That is, specifically it is found that the DI value defined in expression (1) may be limited to a predetermined range in addition to limiting each composition amount of the rolling member; the DI value is limited to 4.0 or less. On the other hand, if the DI value is too small, the hardenability is insufficient and the DI value can be applied only to small-diameter bearings, lacking in convenience, thus the cost effectiveness is low. Therefore, the DI value is set to 1.5 or more to insure sufficient hardenability.

Now, assigning the maximum values of the compositions C, Si, Mn, and Cr to expression (1), DI=4.71 inches; assigning the minimum values of the compositions to expression (1), DI=0.84 inches where C content is 0.6% (but DI=0.965 inches where C content is 0.8%). These values are outside the DI value limit range of the invention (1.5–4.0 inches). That is, if each composition amount range in the rolling member is satisfied, the resultant value may be placed outside the range of the invention; preferably, both each composition amount range and the DI value limit range are satisfied at the same time.

[Retained austenite]

The retained austenite affects the rolling life desirably and has a large effect in use particularly in an environment wherein the bearing raceway surface is damaged and flakes off in severe use conditions, for example, under lubrication mixed with a foreign material. Therefore, a rolling bearing exposed to comparatively severe load and lubrication conditions, such as a taper roller bearing, shall contain 8% by volume of the retained austenite of the inner and outer races and the rolling elements (rollers). On the other hand, if the amount exceeds 22% by volume, the static mechanical strength of the rolling elements and the inner and outer races lowers remarkably. Thus, the content is set to 8%–22% by volume and preferably 12%–22% by volume.

If the life under severe conditions is not required more than necessary and the bearings are used in an environment in which load is comparatively light and it is less feared that a foreign material will be mixed in a lubricant (for example, rolling parts using balls as rolling elements such as ball bearings), importance may be attached to corrosion resistance, dimension stability, sound characteristic, etc., more than the life under lubrication mixed with a foreign material. Since the retained austenite is not required more than necessary under such conditions, the lower limit value need not be defined.

As we have discussed, the rolling member of the invention contains a basic composition of carbon steel for machine structures generally hard to conceive as a bearing material; the material or working cost is minimized and the manufacturing cost is reduced drastically by optimum alloy composition design. Further, considering a production problem of breakage at the heat treatment time, longer-life and more inexpensive rolling members than those made of bearing steel from the functional viewpoint are provided.

The "foreign material" in the description made so far refers to a material producing an impression when it is caught between rolling members such as a metal piece, the impression becoming the start point of cracks, having a harmful effect on the rolling life.

The critical meaning of numeric value limits, etc., according to the second aspect of the present invention will be discussed hereinafter.

A case will be discussed where a low-cost rolling device comprising a plurality of rolling members and mated members used for application wherein water easily enters (namely, to accomplish the second object of the invention) is applied to a rolling bearing.

The rolling bearing usually is made up of an outer race, an inner race, a plurality of rolling elements, a cage, and a seal; the outer race and the inner race, which will also be hereinafter called inner and outer races, and the rolling elements are as follows:

[Inner and outer races]

The numeric value limits and critical meaning of C, Cr, Mn, Si, and DI value, and the retained austenite after heat treatment are the same as those of the material of the above-mentioned embodiment according to the first aspect of the present invention except that the upper limit of Si is set to 0.5% by weight to improve workability. Particularly, if the conditions of lubrication mixed with a foreign material are comparatively moderate as with ball bearings using balls as rolling elements, the lower limit value of the retained austenite need not be defined.

The material of the inner and outer races of the invention is bearing steel with the Cr amount decreased to lower corrosion resistance moderately and added Mn increased to provide hardenability and reduce the material and working costs of the inner and outer races of the bearing drastically.

[C of rolling element: Content 0.95%–1.1%]

As described earlier, basically the rolling element uses the SUJ2 material from the relationship of the ball manufacturing process. Therefore, the C composition range is 0.95%–1.1% as defined in JIS G4805.

[Cr of rolling element: Content 1.3%–1.6%]

For Cr of the rolling element, as described earlier, basically the SUJ2 material is used because SUJ2 is lower cost as a whole (also considering that soaking is required). Then, the Cr amount range is 1.3%–1.6% as defined in JIS G4805.

[Mn of rolling element: Content 0.1%–0.5%]

As described above, basically the rolling element uses the SUJ2 material. Thus, the Mn amount range is 0.5% or less as defined in JIS G4805. If the addition amount is too small, hardenability proper as a bearing material becomes insufficient, thus the lower limit is set to 0.1% or more.

[Si of rolling element: Content 0.15%–0.35%]

As described above, basically the rolling element uses the SUJ2 material. Thus, the Si amount range is 0.15%–0.35% as defined in JIS G4805.

[Matrix Cr content difference between inner and outer races and rolling elements: 0.6% or more]

As described earlier, the bearing life in an environment in which corrosion occurs due to entry of water, etc., is prolonged if the corrosion resistance of inner and outer races is lowered a little with respect to rolling elements. To check the life prolonging effect furthermore experimentally, the following life test is conducted:

A ball bearing comprising rolling elements made of SUJ2 material and inner and outer races made of material with the Cr content lower than that of the rolling elements is used to conduct a life test in a state in which water is mixed in a lubricant, and the bearing damage state recognized in market research is reproduced. However, the Cr content actually affecting corrosion resistance is the Cr amount contained in a matrix and the Cr amount contained in carbides is almost insignificant. Then, the area coefficient of the carbides is directly measured, the Cr amount in the carbides is calculated from a conversion expression of applying a Cr distribution coefficient in ferrite and carbides ("Tekkou zairyou" Shadan houjin Nippon kinzoku gakkai, 1985, p.44), and all Cr amount minus the calculated Cr amount is used as matrix Cr amount ($_M$Cr). That is, assuming that the measurement value of the carbide area coefficient is Cm, the matrix Cr amount affecting corrosion resistance is represented by the relation:

$$_M Cr = Cr\{1-28(1+4C) \times Cm/10000\} \tag{2}$$

Figure 6:
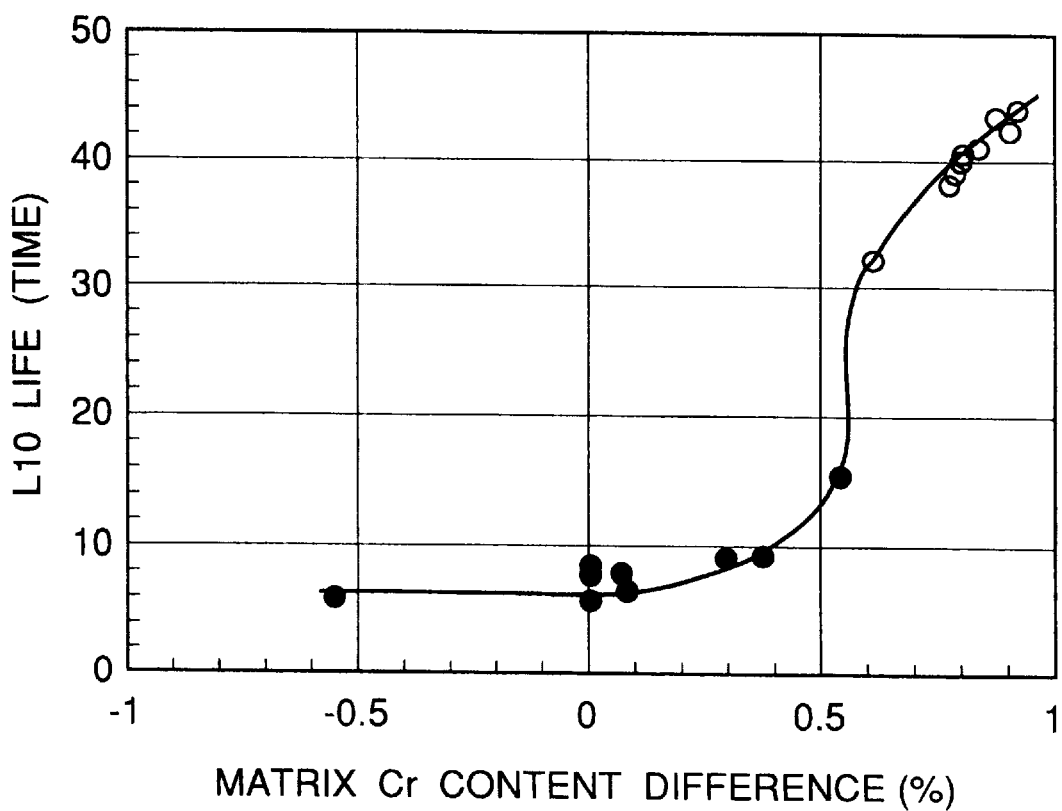
FIG. 6 is a graph to show the life test (matrix Cr content difference and life) results under lubrication mixed with water.

FIG. 6 shows the result of the life test. When the matrix Cr content difference resulting from subtracting $_M$Cr of the inner and outer races from $_M$Cr of the rolling elements falls below 0.6%, the life lowers abruptly. Thus, the matrix Cr content difference between the inner and outer races and the rolling elements is defined as 0.6% or more. However, considering stability of the life, preferably the difference is set to 0.75% or more.

The inventors have examined damaged bearings in detail regarding the above-mentioned phenomenon and have found that (1) cracks branching infinitely and having a complicated shape often occur just under the rolling surface and that (2) the cracks occur at almost constant depth independently of the bearing load. It is hard to consider that the cracks occur due to rolling fatigue; it is estimated that water decomposes to generate hydrogen in an environment in which water is mixed in the lubricant and corrosion occurs, and that hydrogen enters the bearing raceway surface and makes the surface brittle, leading to early breakage.

Since hydrogen generated due to corrosion tends more to enter metal on the cathode side where corrosion resistance is high and rust does not occur (oxygen generated at the same time tends to enter the side where corrosion resistance is low), it is considered that the life prolonging effect is produced by making the corrosion resistance of the inner and outer races a little lower than that of the rolling elements. Among the rolling elements and the inner and outer races, the fixed race load zone is the severest load condition as described above. Thus, the fixed race is not placed on the cathode side, whereby the above-mentioned breakage caused by hydrogen hardly ever occurs.

The critical meaning of numeric value limits, etc., according to the third aspect of the present invention will be discussed hereinafter.

The material constitution and other characteristics of compositions for applying bearing devices to accomplish the third object of the invention to ball bearings used for HDDs, VCTs, air conditioner fan motors, etc., for which a good sound characteristic is required will be discussed.

[Inner and outer races]

The numeric value limits and critical meaning of C, Si, Mn, and Cr amounts are the same as those of the second aspect of the present invention described above. However, for C, when the retained austenite amount is set to 6% or less for the purpose of sound characteristic improvement, the lower limit can be selected up to 0.6%. In doing so, a long life under lubrication mixed with a foreign material is lowered to some extent, but both sound characteristic improvement and a long life under lubrication mixed with a foreign material can be accomplished in good balance.

In the material constitution of the inner and outer races in the bearing device according to the third aspect of the present invention, the C and Cr amounts are decreased relative to the conventional bearing steel to moderately lower the carbide area coefficient of the raceway surface and Mn is increased to provide hardenability for drastically reducing the material and working costs of the inner and outer races of the bearing.

[Rolling elements]

The numeric value limits and critical meaning of C, Si, Mn, and Cr amounts are the same as those to accomplish the second object of the invention described above.

[Retained austenite amount on finished product surface of inner and outer races does not exceed 6%]

The retained austenite amount when rolling devices or rolling members are used for sound characteristic improvement will be discussed.

Sound problems of ball bearings are that the initial sound of a new product is poor or that sound is degraded as the product is used. The sound of a new product depends on bearing clearance, working accuracy, surface coarseness, etc. If the factors concerning bearing manufacturing are standardized (for example, JIS G 1514, grade 5 or more), when a bearing is built in, rolling elements are pressed against inner and outer races and minute impressions occur on the inner and outer races, which becomes the main cause of worsening the initial sound. Easy occurrence of minute impressions depends on the hardness and structure of the bearing.

In the invention, an anderon value is used in a bearing sound evaluation method. The anderon value is provided by taking bearing sound noise as a vibration component with an anderon meter.

Figure 7:
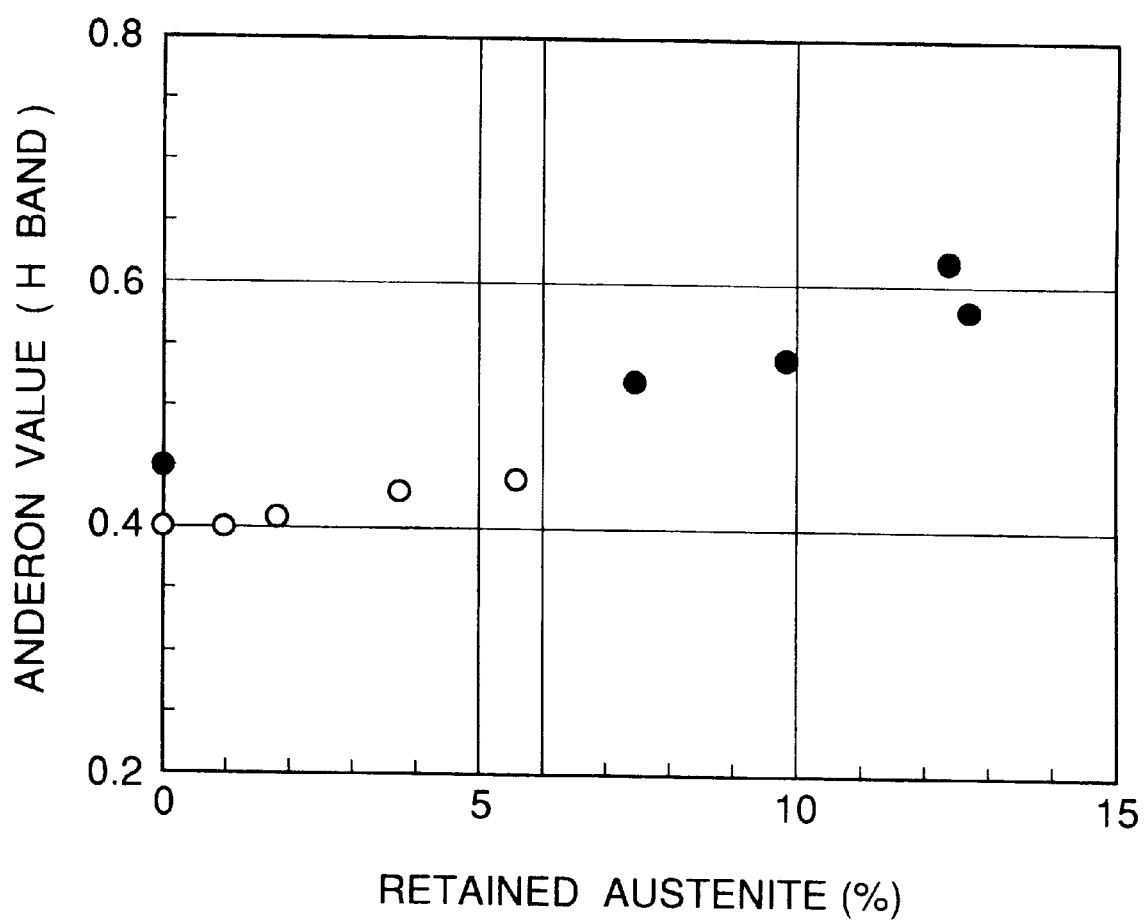
FIG. 7 is a graph to show the measurement results of an initial sound evaluation test (retained austenite amount on finished product surface of inner and outer races and anderon value)

FIG. 7 shows the test result of the relationship between the anderon value of a bearing as a new product and the retained austenite amount of inner and outer races of finished product bearing. If the retained austenite amount grows exceeding 6%, minute impressions easily occur. As a result, the initial sound worsens. The initial sound of the conventional SUJ2 bearing (●) is higher than that of the bearing of the invention (0) even in the same austenite amount.

On the other hand, for sound degradation as a bearing is used, if the bearing is held for a long time in a preload state, particularly at higher temperature, minute impressions easily occur on the contact portions between the rolling elements and the inner and outer races, degrading sound. If an impact load is imposed on the bearing, minute impressions also occur on the contact portions between the rolling elements and the inner and outer races, degrading sound remarkably.

Figure 8:
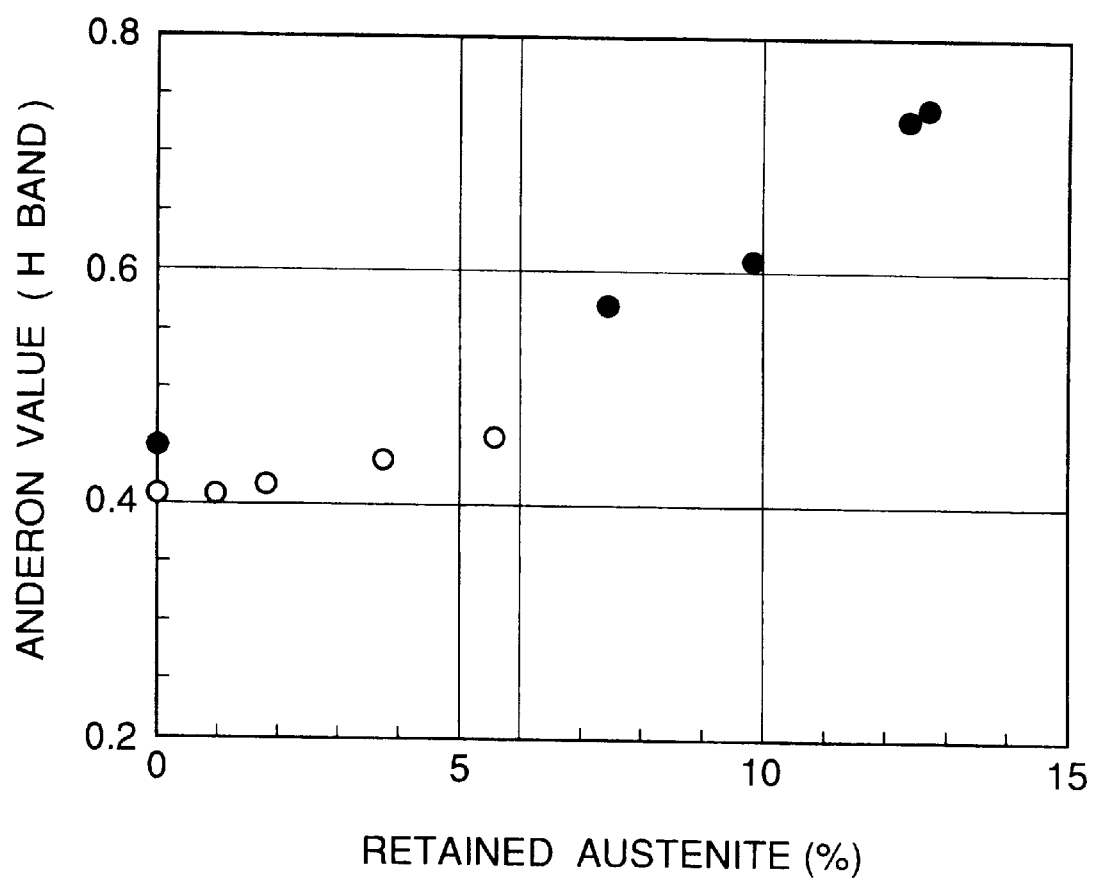
FIG. 8 is a graph to show the measurement results of a sound degradation test (retained austenite amount on finished product surface of inner and outer races and anderon value)

FIG. 8 shows the result of imposing a given load on the bearing whose initial sound is measured in FIG. 7 for causing minute impressions to occur and then again executing sound measurement. If the retained austenite amount grows exceeding 6%, minute impressions still easily occur, worsening sound remarkably.

Thus, the retained austenite amount on the finished product surface of the bearing according to the third aspect of the present invention shall not exceed 6%. Further, if the initial sound and sound degradation level are required strictly, preferably the retained austenite amount does not exceed 2%. However, the hardness and structure of the rolling elements affect the ball bearing sound characteristic, thus preferably, ball coarseness is 3 μm Rms or less, surface hardened treatment is executed after heat treatment, and tempering is again executed.

[Ratio between carbide area coefficient of rolling elements and that of inner and outer races does not exceed 0.9]

As described above, the sound of a new product depends on bearing clearance, working accuracy, surface coarseness, etc. If the factors concerning bearing manufacturing are standardized (for example, JIS G 1514, grade 5 or more), when a bearing is built in, rolling elements are pressed against inner and outer races and minute impressions occur on the inner and outer races, thereby worsening sound. However, the retained austenite amount on the finished product surface is not set exceeding 6%, whereby the initial sound can be decreased. Also, the retained austenite amount is not set exceeding 6%, whereby sound degradation as the bearing is used can be prevented.

The inventors have studied further reduction in the initial sound and have captured subtle change in the sound characteristic according to "swell" combination of the inner and outer races and the rolling elements. That is, the inventors have found that vibration caused by "swell" is damped if placement of carbides becoming projections particularly in a delicate uneven shape on the work finished face is lowered only for the inner and outer races by adjusting the carbide amount on the bearing finished raceway surface.

Figure 9:
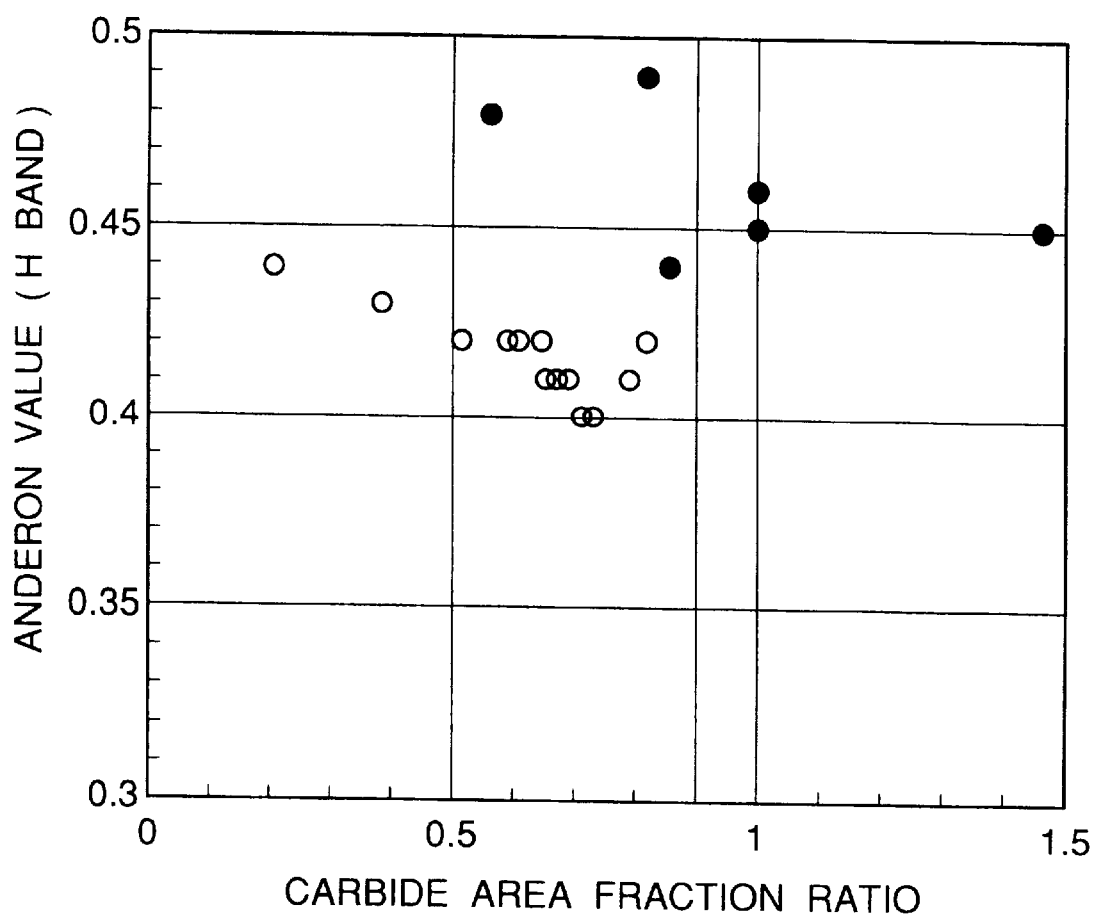
FIG. 9 is a graph to show the measurement results of an initial sound evaluation test (carbide area coefficient ratio between inner and outer races and rolling elements and anderon value).

FIG. 9 shows the relationship between the ratio defined by dividing the carbide area coefficient of the inner and outer races by that of the rolling elements and the sound characteristic. In the figure, (0) denotes the bearing of the invention and (●) denotes the conventional SUJ2 bearing. The sound decreasing effect according to the combination appears in the region in which the carbide area coefficient ratio value defined be dividing the carbide area coefficient of inner and outer races by that of rolling elements (that is, =carbide area coefficient of inner and outer races/carbide area coefficient of rolling elements) does not exceed 0.9.

Note that the carbide area coefficient ratio value is defined by dividing the carbide area coefficient of inner or outer races by the carbide area coefficient of rolling elements.

As we have discussed, if working is performed at the current high working accuracy technical level under bearing specifications considering sound, the ratio of the carbide area coefficient of the inner and outer races to that of the rolling elements needs to be set to a range not exceeding 0.9 to furthermore decrease the initial sound characteristic in the same retained austenite amount. Further, if the initial sound and sound degradation level are required strictly, preferably the carbide area coefficient ratio is set to the range of 0.5 to 0.9.

Hereinafter, Example 1 according to the first aspect of the present invention will be discussed.

EXAMPLE 1

Example 1 assumes application to roller bearings, etc., in particularly severe conditions under lubrication mixed with a foreign material.

Since inner and outer races and rolling elements are manufactured by different methods although they are rolling members, a general manufacturing process is assumed for evaluating material workability.

That is, to manufacture the inner and outer races, usually a material is warm- or hot-forged, then spheroidized or softened, then turned and worked. On the other hand, to manufacture the rolling elements, a material may be turned and worked as with the inner and outer races; for most small bearings, cold working (header working, press working) is executed for a coil material. Then, a machinability test with a high-speed lathe is conducted for the inner and outer races and evaluation of cold workability by header working is executed for the rolling elements.

(1) Alloy compositions and evaluation of necessity for soaking treatment, cutting tool life, metal mold life, and grindability Table 1 lists composition constitutions and DI values of steel species of the example and a comparative example. Table 2 lists necessity for soaking treatment and evaluation and comparison results of cutting tool life, metal mold life by header working, and grindability.

TABLE 1

| | Steel Species | C (wt %) | Si (wt %) | Mn (wt %) | Cr (wt %) | DI Value |
|---|---|---|---|---|---|---|
| Example | A1 | 0.87 | 0.30 | 0.87 | 0.25 | 2.1 |
| | A2 | 0.89 | 0.35 | 0.80 | 0.30 | 2.2 |
| | A3 | 0.83 | 0.45 | 0.91 | 0.55 | 3.3 |
| | A4 | 0.85 | 0.48 | 0.75 | 0.35 | 2.4 |
| | A5 | 0.87 | 0.44 | 1.07 | 0.54 | 3.8 |
| | A6 | 0.83 | 0.54 | 0.78 | 0.20 | 2.0 |
| | A7 | 0.86 | 0.17 | 0.65 | 0.48 | 2.1 |
| | A8 | 0.81 | 0.25 | 0.80 | 0.14 | 1.6 |
| Comparative Example | A9 | 0.65 | 0.33 | 0.82 | 0.32 | 1.9 |
| | A10 | 0.78 | 0.36 | 0.81 | 0.32 | 2.2 |
| | A11 | 0.89 | 0.68 | 1.08 | 0.48 | 4.1 |
| | A12 | 0.88 | 0.46 | 1.07 | 0.04 | 1.9 |
| | A13 | 0.84 | 0.32 | 1.23 | 0.33 | 3.1 |
| | A14 | 0.86 | 0.74 | 1.06 | 0.45 | 3.9 |
| | A15 | 0.89 | 0.48 | 1.75 | 0.04 | 3.3 |
| | A16 | 0.90 | 0.61 | 1.50 | 0.35 | 4.8 |
| | A17 | 0.81 | 0.18 | 0.72 | 0.12 | 1.3 |
| | A18 | 1.02 | 0.35 | 0.83 | 0.33 | 2.5 |
| | A19 | 0.85 | 0.34 | 0.83 | 0.75 | 3.5 |
| | SUJ2 | 1.01 | 0.23 | 0.32 | 1.45 | 3.1 |

TABLE 2

| | Steel Species | Soaking treatment | Metal mold life (×10 pieces) | Tool life (min) | No. of ground piece | Quench crack evaluation test Rolling element | Rate |
|---|---|---|---|---|---|---|---|
| Example | A1 | No required | 216 | 222 | 30 | ○ | ○ |
| | A2 | No required | 213 | 218 | 29 | ○ | ○ |
| | A3 | No required | 208 | 210 | 28 | ○ | ○ |
| | A4 | No required | 216 | 223 | 30 | ○ | ○ |
| | A5 | No required | 211 | 204 | 28 | ○ | ○ |
| | A6 | No required | 228 | 224 | 30 | ○ | ○ |
| | A7 | No required | 225 | 219 | 29 | ○ | ○ |
| | A8 | No required | 231 | 224 | 31 | ○ | ○ |
| Comparative Example | A9 | No required | 253 | 218 | 30 | ○ | ○ |
| | A10 | No required | 219 | 225 | 29 | ○ | ○ |
| | A11 | No required | 145 | 107 | 29 | ○ | x |
| | A12 | No required | 220 | 227 | 28 | ○ | x |
| | A13 | No required | 75 | 63 | 28 | x | x |
| | A14 | No required | 68 | 61 | 29 | ○ | ○ |
| | A15 | No required | 69 | 60 | 27 | x | x |
| | A16 | No required | 64 | 58 | 28 | x | x |
| | A17 | No required | 237 | 228 | 31 | ○ | ○ |
| | A18 | Required | 78 | 65 | 28 | ○ | ○ |
| | A19 | Required | 152 | 112 | 29 | ○ | ○ |
| | SUJ2 | Required | 56 | 55 | 28 | ○ | ○ |

To determine whether or not the soaking treatment is required, the macro structure and microstructure of billet cross section of specimen material are examined and it is checked whether macro carbides or thick stripe segregation harmful for the life exists.

The cutting tool life and the metal mold life are evaluated under the following conditions:

Cutting tool life:

Cutting machine: High-speed lathe

Tool: P10 (JIS B 4053)

Cut rate: 180–220 m/sec

Feed amount: 0.2–0.3 mm/rev

Depth of cut: 0.6–1.0 mm

Specimens are cut under these conditions in accordance with a cutting tool cutting test method (JIS B 4011) and the cutting tool is assumed to reach the tool life when the flank wear amount of the cutting tool reaches 0.2 mm. Steel in the example and comparative example is high-carbon bearing material. Before turning and working, the steel is spheroidized (heated to A1 point or more of the material) for supply to the test.

Metal mold life:

Metal mold: V30 (JIS B 4053)

Fractional reduction in upsetting height: 15%–20%

Working rate: 300–400 pieces per minute

Lubrication: Zinc phosphate coat+lubricant

The steel species are worked. When cracks occur on the metal mold or the metal mold is broken and a flaw or deformation appears on a worked workpiece, the metal mold is assumed to reach the metal mold life, which is indicated in the number of workpieces worked so far.

The soaking treatment is determined to be required for the steel species with the C amount exceeding 0.9% or with the Cr amount exceeding 0.6% as a result of the examination.

For the metal mold life and machinability, workability lowers for the steel species with the C amount exceeding 0.9%, the Mn amount exceeding 1.1%, the Cr amount exceeding 0.6%, the Si amount exceeding 0.7%, thus the metal mold life and the tool life tend to decrease remarkably. A part of the evaluation test after the heat treatment is not conducted for the steel species other than SUJ1 for which the metal mold or tool life decreases remarkably.

The heat treatment conditions are as follows:
Hardening: Hold at 830° C.–870° C. (in Cp 0.6–0.8 RX gas atmosphere) for 30–40 minutes, then harden in an oil bath at 60° C.–90° C. (after hardening, wash and degrees, then cool to room temperature).
Tempering: At 160° C.–180° C. for 2 hours An evaluation experiment of grinding workability is conducted for the steel species with good cold workability and machinability to which the above-mentioned heat treatment is applied. The test conditions are as follows:
[Grinding test]
Grind stone: WA100
Grinding liquid: Soluble type
Grind stone peripheral speed: 2800–3000 m/min Denkiseikou kenkyujyo, Rikougakusha, published on May 25, 1969) is used for the life test. The cumulative number of stress repetitions to the time when flaking occurs on each sample (life) is examined, Weibull plots are prepared, and each L10 life is found from the Weibull distribution result. Further, a static crushing test is conducted for the rolling elements and a rotation breakage fatigue test is conducted for the races as other function evaluation tests.

The test conditions are as follows:

(Table 3 lists the retained austenite amounts measured on life test pieces each 6 mm thick and the function evaluation results thereof.)

TABLE 3

| | Steel species | $\gamma_R$ (wt. %) | Thrust type life test | | Rolling element crushing strength (ton) | Ring rotation breakage fatigue life $L_{10}$ life ($\times 10^6$) |
| | | | $L_{10}$ life under clean lubrication ($\times 10^7$) | $L_{10}$ life under lubrication mixed with foreign material ($\times 10^4$) | | |
|---|---|---|---|---|---|---|
| Example | A1 | 17 | 5.8 | 15.0 | 25.4 | 4.6 |
| | A2 | 17 | 6.2 | 15.6 | 25.8 | 5.2 |
| | A3 | 19 | 6.3 | 15.3 | 25.5 | 4.8 |
| | A4 | 15 | 6.5 | 15.5 | 25.9 | 4.3 |
| | A5 | 22 | 6.2 | 17.8 | 23.6 | 5.9 |
| | A6 | 16 | 6.8 | 15.6 | 25.4 | 4.7 |
| | A7 | 12 | 5.7 | 13.8 | 25.3 | 3.8 |
| | A8 | 15 | 3.8 | 14.2 | 24.7 | 3.7 |
| Comparative | A9 | 9 | 0.8 | 1.8 | 20.1 | 2.1 |
| Example | A10 | 10 | 1.0 | 2.1 | 22.1 | 2.3 |
| | A12 | 24 | 2.2 | 16.5 | 16.4 | 1.1 |
| | A17 | 16 | 1.6 | 12.4 | 16.4 | 1.8 |
| | SUJ2 | 8 | 1.4 | 1.9 | 25.4 | 2.2 |

Samples equivalent to the inner raceway surface of a rolling bearing are ground with a grind stone under these conditions, deformation and plugging of the grind stone are observed, and the number of samples ground by the time the grind stone is dressed (number of ground pieces) is examined. As a result, all steel species of the invention are equal to or superior to bearing steel and are also good in grinding workability.

The evaluation is workability evaluation. In fact, a large number of breakages may occur at the heat treatment time because of the effect of the size, shape, etc., of the bearing, lowering heat treatment productivity. Then, quench crack sensibility is also evaluated.

[Quench crack test]

Using test pieces of the rolling elements and races shown in FIG. 3, a quench crack sensibility test is conducted under the same heat treatment conditions as listed above. With the number of test pieces, n=5, the steel species with a quench crack occurring on at least one test piece is marked with X in Table 2. A quench crack tends to easily occur in steel species with the Cr content less than 0.1% or the Mn addition amount exceeding 1.1%, particularly the DI value exceeding 4.0 because of the effect of coarsening crystal grains and the effect of a transformation stress because the Ms point lowers.

(2) Rolling member function evaluation:

A life test, a static crushing test, a rotation breakage fatigue test, and the like are executed for rolling member test pieces formed using the steel species of the example and comparative example and the functions of the rolling members are evaluated and compared.

A thrust type bearing steel life tester described on pages 10–21 of "Tokyshukou binran" First edition (edited by

[Life test]
Life test conditions under clean lubrication:
Test contact pressure: 5200 Mpa
Number of revolutions: 3000 cpm
Lubricant: No. 68 turbine oil
Life test conditions under lubrication mixed with foreign material:
Test contact pressure: 4900 Mpa
Number of revolutions: 3000 cpm
Lubricant: No. 68 turbine oil
Mixed foreign material:
  Constitution: Fe3 C family powder
  Hardness: HRC52
  Grain diameter: 74–147 μm
  Mix amount: 300 ppm in lubricant The rolling members of the example show the life exceeding SUJ2 both under clean lubrication and under lubrication mixed with foreign material. Particularly, long life is obtained because of the effect of the retained austenite under lubrication mixed with foreign material. On the other hand, the steel species with the carbon content less than 0.8% (comparative example steel species A9 and A10) and those with the Cr addition amount less than 0.1% and having a small crystal grain coarsening suppression effect (comparative example steel species) do not produce a good life particularly under clean lubrication.

Figure 4A:
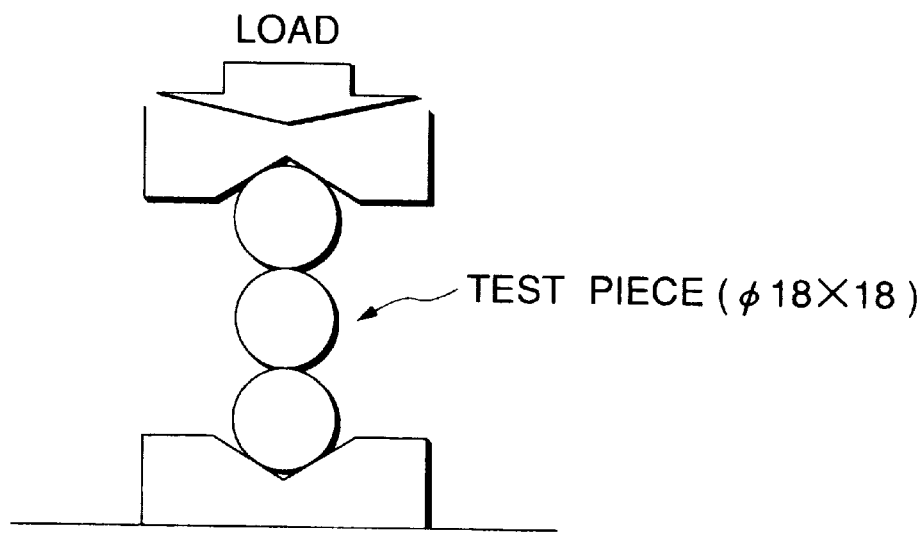
FIG. 4(a) is a schematic diagram to show a rolling element static crushing test method and 4(b) is a schematic diagram to show a ring rotation breakage fatigue test method.

[Other function tests]
Rolling member static crushing test conditions:
Cylindrical rollers 18 mm in diameter and 18 mm in length are used as test pieces and a set of three pieces are tested with a 200t Amsler tester, as shown in FIG. 4(a). The crush value when any one of the test pieces is broken is measured and an evaluation is made with an average value of n=5 sets.

(Ring rotation breakage fatigue test)

Figure 4B:
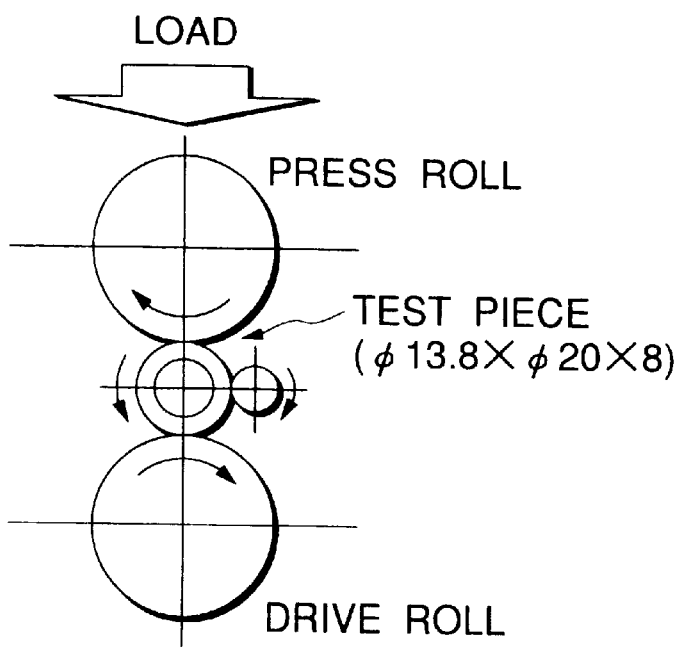

FIG. 4(b) shows an outline of the test method. A ring-like test piece is sandwiched between a press roll and a drive roll and is rotated while a load is imposed on the press roll. The test conditions are listed below. The breakage life is indicated as the number of stress repetitions to breakage from the inner diameter face and is evaluated as L10.

Test load: 400 kgf

Number of stress repetitions: 19260 cpm

Lubricant: No. 68 turbine oil

Test ring: 13.8 mm in inner diameter×20 mm in outer diameter×8 mm thick

In the rolling element static crushing test and the ring rotation breakage fatigue test, the example of the first aspect of the present invention (steel species A1–A8) shows the function equal to or greater than SUJ2. Particularly, in the ring rotation breakage fatigue test, a good life characteristic is provided because the retained austenite acts on crack retention. Example A7 is a little inferior to A1–A6 in thrust type life test and ring rotation breakage fatigue life because Si is less than 0.2%, and example A8 is a little inferior to A1–A6 in thrust type life test (particularly, under clean lubrication) and ring rotation breakage fatigue life because C is less than 0.83%, but they have sufficiently excellent performance as totally compared with comparative examples A9–A17 and SUJ2.

In contrast, in steel species with the carbon content less than 0.8% (A9 and A10) and those with the Cr content less than 0.1% and having hardenability mainly augmented with Mn (A12) in the comparative example, the Cr effect of suppressing coarsening of crystal grains is too small and a good life particularly in the ring rotation breakage fatigue life test is not provided.

Further, for comparative example A12, the retained austenite amount is large exceeding 22% and the crushing strength tends to decrease.

In comparative example A17, which has insufficient hardenability, an incomplete hardening phase occurs in the core and both the crushing strength and the fatigue strength decrease.

As we have discussed, the rolling members of the invention are equal to or greater than the conventional rolling members made of bearing steel (SUJ2) in life and mechanical strength and can be reduced drastically in the material cost and the bearing manufacturing cost as inexpensive rolling members as compared with the conventional rolling members made of bearing steel, producing an extremely large effect on practical use.

The rolling members of the first aspect of the present invention can be preferably applied not only to rolling bearings, but also to parts coming in rolling contact, rotating, or sliding, such as shafts and pins, particularly mechanical parts manufactured by performing cold forging or cold drawing treatment for a material, such as one-way clutch sprags.

Hereinafter, Example 2 according to the second aspect of the present invention will be discussed.

EXAMPLE 2

Example 2 assumes ball bearings, etc., used particularly in conditions where water can enter.

The material compositions of the inner and outer races of the invention and necessity for soaking treatment are evaluated and material workability is evaluated by assuming a general manufacturing process. To work the inner and outer races, usually a material often is warm- or hot-forged, then annealed, then turned and worked.

[Evaluation conditions]

Soaking treatment:

The macro structure and microstructure of billet cross section of specimen material are examined and whether macro carbides or thick stripe segregation harmful for the life exists is checked.

Cutting tool life:

Cutting machine: High-speed lathe

Tool: P10 (JIS B 4053)

Cut rate: 180–220 m/sec

Feed amount: 0.2–0.3 mm/rev

Depth of cut: 0.6–1.0 mm

Specimens are cut under these conditions in accordance with a cutting tool cutting test method (JIS B 4011) and the cutting tool is assumed to reach the tool life when the flank wear amount of the cutting tool reaches 0.2 mm. However, steel in the example of the invention and comparative example is high-carbon bearing material. Before turning and working, the steel is spheroidized (heated to A1 point or more of the material).

Table 4 lists the evaluation results.

TABLE 4

| | Steel Species | C (wt %) | Si (wt %) | Mn (wt %) | Cr (wt %) | Soaking treatment | Tool life (min) |
|---|---|---|---|---|---|---|---|
| Example | C1 | 0.86 | 0.25 | 0.90 | 0.27 | Not required | 225 |
| | C2 | 0.85 | 0.22 | 0.85 | 0.33 | Not required | 218 |
| | C3 | 0.86 | 0.34 | 0.82 | 0.23 | Not required | 216 |
| | C4 | 0.88 | 0.36 | 0.83 | 0.33 | Not required | 210 |
| | C5 | 0.81 | 0.37 | 0.85 | 0.34 | Not required | 220 |
| | C6 | 0.82 | 0.47 | 0.83 | 0.32 | Not required | 205 |
| | C7 | 0.84 | 0.15 | 0.83 | 0.33 | Not required | 220 |
| | C8 | 0.85 | 0.33 | 1.03 | 0.32 | Not required | 202 |
| | C9 | 0.82 | 0.34 | 0.58 | 0.34 | Not required | 220 |
| | C10 | 0.84 | 0.35 | 0.84 | 0.55 | Not required | 208 |
| | C11 | 0.83 | 0.33 | 0.83 | 0.17 | Not required | 219 |
| | C12 | 0.85 | 0.18 | 0.85 | 0.19 | Not required | 235 |
| Comparative | C13 | 1.02 | 0.31 | 0.83 | 0.35 | Required | 65 |
| | C14 | 0.75 | 0.33 | 0.82 | 0.34 | Not required | 218 |
| Example | C15 | 0.70 | 0.28 | 0.81 | 0.38 | Not required | 223 |
| | C16 | 0.65 | 0.30 | 0.85 | 0.48 | Not required | 236 |
| | C17 | 0.61 | 0.29 | 0.86 | 0.54 | Not required | 249 |
| | C18 | 0.83 | 0.62 | 0.83 | 0.31 | Not required | 122 |
| | C19 | 0.83 | 0.05 | 0.83 | 0.34 | Not required | 232 |
| | C20 | 0.84 | 0.32 | 1.23 | 0.33 | Not required | 63 |
| | C21 | 0.82 | 0.34 | 0.35 | 0.32 | Not required | 241 |
| | C22 | 0.85 | 0.34 | 0.83 | 0.75 | Required | 112 |
| | C23 | 0.82 | 0.33 | 0.84 | 0.04 | Not required | 223 |
| | SUJ2 | 1.01 | 0.23 | 0.32 | 1.45 | Required | 55 |

The inner and outer race material of the second aspect of the present invention need not undergo soaking treatment and is also good in machinability; the material and working costs can be reduced as compared with conventional SUJ2. On the other hand, comparative examples C13 and C22 containing high C % and high Cr % are determined to need soaking treatment, and are not good in workability. Comparative examples C18 and C20 containing high Si % and high Mn % also lower in workability. C18 contains upper limits or less of C and Mn and has Si less than 0.7%, thus is good as compared with C20 and SUJ2, but worsens a little as compared with C1–C12 containing Si 0.5% or less.

The invention is intended for satisfying cost reduction and a long life, thus normal hardening treatment and tempering treatment most often used for general rolling bearings and at the lowest cost are adopted for executing an evaluation test; carburizing, carbonitriding, etc., is not performed.

The heat treatment conditions in the example according to the second aspect of the present invention are as follows:

Heat treatment conditions:

Hold in the temperature range of 810° C.–850° C. for 0.5–1 hour in an RX gas atmosphere at carbon potential Cp=0.6–0.8, then harden, next temper for 2 hours at 160° C.–200° C.

[Life test conditions under lubrication mixed with foreign material]

A thrust type bearing steel life tester described on pages 10–21 of "Tokyshukou binran" First edition (edited by Denkiseikou kenkyujyo, Rikougakusha, published on May 25, 1969) is used. SUJ2 balls are used for rolling elements. The cumulative number of stress repetitions to the time when flaking occurs on each sample (life) is examined, Weibull plots are prepared, and each L10 life is found from the Weibull distribution result.

Test contact pressure: 4900 Mpa Max.
Number of revolutions: 3000 cpm
Lubricant: No. 68 turbine oil
Mixed foreign material:
Constitution: Stainless family powder
Hardness: HRC50
Grain diameter: 35–95 $\mu$m
Mix amount: 300 ppm in lubricant
Table 5 lists the life evaluation results.

TABLE 5

| | Steel Species | Surface Hardness (Hv) | Life under lubrication mixed With foreign material $L_{10}$ life (×10$^6$) |
|---|---|---|---|
| Example | C1 | 750 | 15.3 |
| | C2 | 746 | 14.8 |
| | C3 | 741 | 16.3 |
| | C4 | 764 | 15.6 |
| | C5 | 748 | 15.1 |
| Comparative Example | C13 | 745 | 15.1 |
| | C14 | 737 | 9.2 |
| | C15 | 723 | 7.2 |
| | C16 | 719 | 6.5 |
| | C17 | 706 | 5.8 |
| | C19 | 683 | 3.1 |
| | C21 | 658 | 2.8 |
| | C23 | 694 | 3.4 |
| | SUJ2 | 745 | 9.8 |

The inner and outer race material according to the second aspect of the present invention has hardness Hv 700 or more after hardening and tempering and shows a long life. Comparative example C13 inferior in workability, but containing C % of about 1% shows hardness and life almost equal to those of the inner and outer material of the invention. On the other hand, SUJ2 lowers a shorter life at the normal hardening temperatures adopted in the example as compared with the inner and outer material of the invention. C14–C17 containing less than 0.8% of C % to enhance only workability tend to be lower in 15 hardness and retained austenite; the life is shorter. C19, C21, and C23 containing less than the lower limits of Si, Mn, and Cr have hardness of Hv 700 or less; the life is shorter.

[Life test conditions under lubrication mixed with water]

Next, a life test is conducted assuming entry of water in a lubricant under clean lubrication to reproduce the damage state on the market. Grease lubrication is executed, a bearing seal is removed, and tap water is poured into a bearing housing at a rate of 1 cc/hour.

Test bearing: 6203 (single row deep groove ball bearing)
Test contact pressure: 2000 Mpa Max.
Number of revolutions: 7000 cpm
Lubricant: Albanial grease (Showa shell)
Water mixing: 1 cc/hour (tap water)

The carbide area coefficient is used to find the matrix Cr content difference. To directly measure the area coefficient, the issue on the bearing surface is shot under an electron microscope, only carbides are extracted from the ground of the electron microscope image by an image analyzer, and the area, the number of pieces, and the like are measured for calculating the area coefficient.

Electron microscope: JSM-T220A manufactured by Nihon densisha
Image analyzer: IBAS2000 manufactured by Table 6 lists the test results.

TABLE 6

| | No. | Inner and outer race steel species | Rolling element steel species | Matrix Cr difference (%) | Life under lubricant mixed with water $L_{10}$ (hour) |
|---|---|---|---|---|---|
| Example | 1 | C1 | SUJ2 | 0.84 | 41.2 |
| | 2 | C2 | SUJ2 | 0.79 | 39.2 |
| | 3 | C3 | SUJ2 | 0.88 | 43.6 |
| | 4 | C4 | SUJ2 | 0.80 | 40.9 |
| | 5 | C5 | SUJ2 | 0.78 | 38.6 |
| | 6 | C6 | SUJ2 | 0.80 | 39.8 |
| | 7 | C7 | SUJ2 | 0.79 | 39.4 |
| | 8 | C8 | SUJ2 | 0.80 | 40.2 |
| | 9 | C9 | SUJ2 | 0.78 | 38.3 |
| | 10 | C10 | SUJ2 | 0.61 | 32.4 |
| | 11 | C11 | SUJ2 | 0.93 | 44.3 |
| | 12 | C12 | SUJ2 | 0.91 | 42.6 |
| Comparative Example | 13 | SUJ2 | SUJ2 | 0 | 9.0 |
| | 14 | C17 | SUJ2 | 0.55 | 15.6 |
| | 15 | C17 | C17 | 0 | 8.2 |
| | 16 | C1 | C17 | 0.30 | 9.3 |
| | 17 | C10 | C17 | 0.07 | 8.5 |
| | 18 | C11 | C17 | 0.38 | 9.7 |
| | 19 | C1 | C1 | 0.00 | 6.3 |
| | 20 | C11 | C1 | 0.08 | 7.2 |
| | 21 | SUJ2 | C17 | −0.55 | 6.5 |

Each of combinations of the inner and outer races of the of C1–C12 and the rolling members made of SUJ2 contains the matrix Cr content difference of 0.6% or more and provides a sufficient endurance life even under lubrication mixed with water.

On the other hand, comparative example containing the Cr content difference of less than 0.6% is shortened in endurance life. Nos. 13, 15, and 19 comprising the same steel species in combination also contain the Cr content difference of less than 0.6%, and thus are shorter in life; the same steel species combination having better corrosion resistance is a little longer in life. In contrast, No. 21 having lowered corrosion resistance of the rolling element has a short life.

Thus, the life prolonging effect of the bearing of the invention in an environment in which corrosion of rust, etc., occurs due to entry of water, etc., is produced by making corrosion resistance of the inner and outer races appropriately lower than that of the rolling elements. Since it is difficult to change the steel species of the rolling elements of ball bearings from working process control, SUJ2 is used as material and is combined with the inner and outer races made of low-cost material containing the Cr amount decreased for appropriately lowering corrosion resistance, whereby lower-cost and longer-life bearings than the conventional bearings can be provided.

Hereinafter, Example 3 according to the third aspect of the present invention will be discussed.

EXAMPLE 3

Example 3 assumes ball bearings, etc., particularly for application where low vibration and low noise are required.

SUJ2 is used as material of rolling elements. Steel species E1–E15 of material compositions listed in Table 7 (example) and steel species E16–E23 and SUJ2 for comparison (comparative example) are used as inner and outer races.

(1) Alloy compositions and evaluation of necessity for soaking treatment and workability First, necessity for soaking treatment is evaluated for each specimen material and a cutting test with a high-speed lathe is conducted based on a general manufacturing process of the inner and outer races for evaluating workability.

[Evaluation conditions]

The soaking treatment and cutting workability evaluation conditions are the same as those of examples 1 and 2. That is, for the soaking treatment, the macro structure and microstructure of billet cross section of specimen material are examined, and it is checked whether macro carbides or thick stripe segregation harmful for the life exists. For the cutting workability, specimens are cut under the above-described conditions in accordance with a cutting tool cutting test method (JIS B 4011) and the time (minutes) until the flank wear amount of the cutting tool reaches 0.2 mm is assumed to be the tool life. The workability is evaluated according to the tool life.

Table 7 lists the results.

[Heat treatment conditions]

Hold for 0.5–1 hour at temperatures 810° C.–850° C., then harden. Subsequently, temper under the following heat treatment conditions:

Heat treatment condition: A

Temper for two hours at 160° C.–200° C.

Heat treatment condition: B

Temper for two hours at 200° C.–240° C.

Heat treatment condition: C

Temper for two hours at 220° C.–260° C. immediately after subzero treatment is applied.

Table 9 lists the retained austenite amount measurement results for the finished product specimens provided. As a result, heat treatment A with the retained austenite amount of the inner and outer races exceeding 12% by volume is

TABLE 7

| | Steel Species | C (wt %) | Si (wt %) | Mn (wt %) | Cr (wt %) | Soaking treatment | Tool life (min) |
|---|---|---|---|---|---|---|---|
| Example | E1 | 0.86 | 0.25 | 0.90 | 0.27 | Not required | 225 |
| | E2 | 0.85 | 0.22 | 0.85 | 0.33 | Not required | 218 |
| | E3 | 0.83 | 0.34 | 0.82 | 0.23 | Not required | 216 |
| | E4 | 0.88 | 0.36 | 0.83 | 0.33 | Not required | 210 |
| | E5 | 0.81 | 0.37 | 0.85 | 0.34 | Not required | 220 |
| | E6 | 0.82 | 0.47 | 0.83 | 0.32 | Not required | 205 |
| | E7 | 0.84 | 0.15 | 0.83 | 0.33 | Not required | 220 |
| | E8 | 0.85 | 0.33 | 1.03 | 0.32 | Not required | 202 |
| | E9 | 0.82 | 0.34 | 0.58 | 0.34 | Not required | 220 |
| | E10 | 0.84 | 0.35 | 0.84 | 0.55 | Not required | 208 |
| | E11 | 0.83 | 0.33 | 0.83 | 0.17 | Not required | 219 |
| | E12 | 0.85 | 0.18 | 0.85 | 0.19 | Not required | 235 |
| | E13 | 0.75 | 0.33 | 0.82 | 0.34 | Not required | 218 |
| | E14 | 0.70 | 0.28 | 0.81 | 0.38 | Not required | 223 |
| | E15 | 0.65 | 0.30 | 0.85 | 0.48 | Not required | 236 |
| Comparative Example | E16 | 1.02 | 0.31 | 0.83 | 0.35 | Required | 65 |
| | E17 | 0.56 | 0.29 | 0.86 | 0.54 | Not required | 249 |
| | E18 | 0.83 | 0.62 | 0.83 | 0.31 | Not required | 122 |
| | E19 | 0.83 | 0.05 | 0.83 | 0.34 | Not required | 232 |
| | E20 | 0.84 | 0.32 | 1.23 | 0.33 | Not required | 63 |
| | E21 | 0.82 | 0.34 | 0.35 | 0.32 | Not required | 241 |
| | E22 | 0.85 | 0.34 | 0.83 | 0.75 | Required | 112 |
| | E23 | 0.82 | 0.33 | 0.84 | 0.04 | Not required | 223 |
| | SUJ2 | 1.01 | 0.23 | 0.32 | 1.45 | Required | 55 |

Steel species E1–E15 used as the inner and outer race specimens of the example need not undergo soaking treatment and are also good in machinability; the material and working costs can be reduced as compared with conventional SUJ2. On the other hand, of steel species E1–E15 used as the inner and outer race specimens of the comparative example, E16 and E22 containing high C % and Cr % contents are determined to need soaking treatment, and are not good in workability. E18 and E20 containing high Si % and Mn % contents are also lower in workability.

(2) Evaluation of heat treatment conditions

According to the third aspect of the present invention, hardening treatment and tempering treatment most often used for general rolling bearings and at the lowest cost are applied for executing an evaluation test to provide pieces having a good sound characteristic at low cost; special treatment such as carburizing or carbonitriding is not performed. However, the retained austenite amount needs to be decreased as a sound countermeasure, thus desirable heat treatment conditions are evaluated.

The following three types of heat treatment A–C changing the tempering temperature are applied to inner and outer races and rolling elements made of steel species E1 and SUJ2, and the retained austenite (γR) amounts on the surfaces of the finished product specimens provided are compared.

improper from the viewpoint of sound countermeasures. Heat treatment B and heat treatment C with the less retained austenite amount are proper; heat treatment B applying no subzero treatment is more desirable if importance is attached to the cost.

(3) Life evaluation under lubrication mixed with foreign material

How general ball bearings are used on the market is examined in detail and a life test of tested ball bearings under lubrication mixed with a foreign material is conducted to reproduce the damage state of surface start point type on the market. Balls made of SUJ2 are used as rolling elements. Inner and outer races of the example are made of some steel species selected from among example steel species E1–E15 in Table 7. Inner and outer races of comparative example are made of steel species selected from among comparative example steel species E16–E23 in Table 7. The cumulative stress repetition time to the time when flaking occurs on the inner and outer races of each tested ball bearing (life) is examined, Weibull plots are prepared, and the L10 life of each inner and outer race specimen is found from the Weibull distribution result. On the other hand, likewise a life test is also executed for the inner and outer races made of the SUJ2 material for finding the L10 life. Each L10 life of the inner and outer race specimens of the example and the inner and outer race specimens of the comparative example is divided by the L10 life of the inner and outer races made of SUJ2 to find the life ratio for evaluation.

[Life test conditions under lubrication mixed with foreign material]

Test bearing: 608

Test contact pressure: 1500 Mpa Max.

Number of revolutions: 5000 cpm

Lubricant: No. 68 turbine oil

Mixed foreign material:

Constitution: Stainless family powder
Hardness: HRC 50
Grain diameter: 65–120 μm
Mix amount: 200 ppm in lubricant
Table 8 lists the life evaluation results.

TABLE 8

|  | Steel Species | Surface hardness (Hv) | Life ratio under lubrication mixed with foreign material (to inner and outer race made of SUJ2) |
|---|---|---|---|
| Example | E1 | 750 | 1.53 |
|  | E2 | 746 | 1.48 |
|  | E3 | 741 | 1.63 |
|  | E4 | 764 | 1.56 |
|  | E5 | 748 | 1.51 |
|  | E13 | 737 | 1.23 |
|  | E14 | 723 | 1.02 |
|  | E15 | 719 | 0.98 |
| Comparative Example | E16 | 745 | 1.51 |
|  | E17 | 706 | 0.58 |
|  | E19 | 683 | 0.31 |
|  | E21 | 658 | 0.28 |
|  | E23 | 694 | 0.34 |

The inner and outer race material of the example has hardness Hv 700 or more after hardening and tempering and shows a life equal to or longer than that of conventional SUJ2. On the other hand, comparative example E16 shows a life equal to or longer than that of conventional SUJ2, but is inferior in workability (see Table 7). Steel species E17 containing less than 0.6% as the C amount to enhance only workability tends to be lower in hardness; the life decreases as compared with the conventional inner and outer races made of SUJ2. Steel species E19, E21, and E23 containing less than the lower limits of Si, Mn, and Cr have hardness of Hv 700 or less; the life decreases if the C amount is set to 0.8% or more.

(4) Sound evaluation test:

Next, a sound evaluation test of tested bearings will be discussed. For the sound evaluation, initial sound evaluation and sound degradation evaluation are executed. In the example, an anderon value is used in a bearing sound evaluation method. The anderon value is provided by taking bearing sound noise as a vibration component with an anderon meter. AD-0200 manufactured by Sugawara Kenkyujo (Kabu) is used as the anderon meter.

(4-1) Initial sound evaluation test

Test bearing: 608

Number of revolutions: 1800 rpm

Bearing preload: 2 kgf (thrust load)

Measurement range: H band (1800–10000 Hz)

A new bearing is set on the anderon meter and the anderon value is measured under these conditions. The average value of the anderon values found by measuring 30 bearings under the same conditions is evaluated as the sound level of the bearing. Table 9 and FIG. 7 show the measurement results of the retained austenite amount on the finished product surface of the inner and outer races and the anderon value.

TABLE 9

|  | No. | Inner and outer races Steel species | Inner and outer races Heat treatment | Rolling element Steel species | Rolling element Heat treatment | Retained austenite of the inner and outer races | Retained austenite after the rolling element | Initial Anderon value | Anderon value after load is imposed |
|---|---|---|---|---|---|---|---|---|---|
| Example | 1 | E1 | C | SUJ2 | B | 0 | 5.7 | 0.40 | 0.41 |
|  | 2 | E1 | B | SUJ2 | B | 1.5 | 5.7 | 0.40 | 0.41 |
|  | 3 | E1 | B | SUJ2 | B | 1.8 | 5.7 | 0.41 | 0.42 |
|  | 4 | E1 | B | SUJ2 | B | 3.8 | 5.7 | 0.43 | 0.44 |
|  | 5 | E1 | B | SUJ2 | B | 5.6 | 5.7 | 0.44 | 0.46 |
| Comparative Example | 6 | E1 | B | SUJ2 | B | 7.5 | 5.7 | 0.52 | 0.57 |
|  | 7 | E1 | B | SUJ2 | B | 9.8 | 5.7 | 0.54 | 0.61 |
|  | 8 | E1 | A | SUJ2 | B | 12.8 | 5.7 | 0.58 | 0.74 |
|  | 9 | SUJ2 | C | SUJ2 | B | 0 | 5.7 | 0.45 | 0.46 |
|  | 10 | SUJ2 | A | SUJ2 | B | 12.5 | 5.7 | 0.62 | 0.73 |

Example bearings Nos. 1–5 are good in initial sound. In contrast, comparative example bearings Nos. 6–8 and 10 with retained austenite of inner and outer races exceeding 6% by volume are poor in initial sound because minute impressions easily occur at the bearing assembly time. Comparative example bearing No. 9 provided by applying heat treatment A to the bearing comprising inner and outer races made of the conventional material SUJ2 for reducing the retained austenite amount to zero has higher initial sound than that of example bearing No. 1 having the same austenite amount.

(4-2) Sound degradation test:

The measurement conditions are the same as those of (4-1) initial sound evaluation test. A 50–60 kgf axial load is imposed on the bearing after the initial sound measurement for 5–10 seconds, then sound measurement is again executed for evaluating impression resistance according to the imposed load. The average value of the anderon values found by measuring 30 bearings under the same conditions is evaluated as the sound level of the bearing.

Table 9 and FIG. 8 show the measurement results of the retained austenite amount on the finished product surface of the inner and outer races and the anderon value.

Example bearings Nos. 1–5 are good with less sound degradation from the initial sound. In contrast, comparative example bearings Nos. 6–8 and 10 with retained austenite of inner and outer races exceeding 6% by volume are degraded in sound because minute impressions occur due to the imposed load. Comparative example bearing No. 9 provided by applying heat treatment C containing subzero treatment to the conventional inner and outer races made of SUJ2 for reducing the retained austenite amount to zero has a small sound degradation amount, but higher sound than that of example bearing No. 1 to which heat treatment C is applied.

This means that if the retained austenite amount on the surface of the finished product inner and outer races exceeds 6% by volume, both the initial sound and sound degradation increase. When the retained austenite amount is 6% or less by volume, if the initial sound is low, the sound after the load is imposed can also be lowered.

(5) Initial sound evaluation test according to carbide area coefficient combination of inner and outer races and rolling elements Inner and outer races and rolling elements different in carbide area coefficient are combined and initial sound is evaluated. The measurement conditions are the same as those of (4-1) initial sound evaluation test.

The ratio defined by dividing the carbide area coefficient of inner and outer races by that of rolling elements (that is, a carbide area coefficient ratio=carbide area coefficient of inner and outer races/carbide area coefficient of rolling elements) is used as the evaluation criterion. To directly measure the carbide area coefficient, the issue on the surface of each finished product of the inner and outer races and the rolling elements is shot under an electron microscope, only carbides are extracted from the ground of the electron microscope image by an image analyzer, and the carbide area, the number of pieces, and the like are measured for calculating the area coefficient.

Electron microscope: JSM-T220A manufactured by Nihon densisha

Image analyzer: IBAS2000 manufactured by Table 10 and FIG. 9 show the measurement results.

TABLE 10

| | | No. | Inner and outer races Steel species | Heat treatment | Rolling element Steel species | Heat treatment | Carbide area fraction ratio | Initial Anderon value |
|---|---|---|---|---|---|---|---|---|
| Example | | 11 | E1 | B | SUJ2 | B | 0.68 | 0.41 |
| | | 12 | E2 | B | SUJ2 | B | 0.73 | 0.40 |
| | | 13 | E3 | B | SUJ2 | B | 0.65 | 0.42 |
| | | 14 | E4 | B | SUJ2 | B | 0.79 | 0.41 |
| | | 15 | E5 | B | SUJ2 | B | 0.61 | 0.42 |
| | | 16 | E6 | B | SUJ2 | B | 0.65 | 0.42 |
| | | 17 | E7 | B | SUJ2 | B | 0.69 | 0.41 |
| | | 18 | E8 | B | SUJ2 | B | 0.71 | 0.40 |
| | | 19 | E9 | B | SUJ2 | B | 0.67 | 0.41 |
| | | 20 | E10 | B | SUJ2 | B | 0.82 | 0.42 |
| | | 21 | E11 | B | SUJ2 | B | 0.59 | 0.42 |
| | | 22 | E12 | B | SUJ2 | B | 0.61 | 0.42 |
| | | 23 | E13 | B | SUJ2 | B | 0.51 | 0.42 |
| | | 24 | E14 | B | SUJ2 | B | 0.39 | 0.43 |
| | | 25 | E15 | B | SUJ2 | B | 0.21 | 0.44 |
| Comparative Example | | 26 | SUJ2 | B | SUJ2 | B | 1 | 0.46 |
| | | 27 | SUJ2 | B | E1 | B | 1.47 | 0.45 |
| | | 28 | E1 | B | E1 | B | 1 | 0.45 |
| | | 29 | SUJ2 | B | J1 | B | 0.83 | 0.49 |
| | | 30 | E1 | B | J1 | B | 0.57 | 0.48 |
| | | 31 | E11 | B | E1 | B | 0.86 | 0.44 |

Table 11 lists element examples of SUJ2, E1 steel, and J1 steel in Table 10.

TABLE 11

| | Steel species | C (wt %) | Si (wt %) | Mn (wt %) | Cr (wt %) |
|---|---|---|---|---|---|
| Example | SUJ2 | 1.00 | 0.25 | 0.33 | 1.47 |
| Comparative | E1 | 0.86 | 0.25 | 0.90 | 0.27 |
| Example | J1 | 1.23 | 0.23 | 0.32 | 1.65 |

Example specimen Nos. 11–25 with the carbide area coefficient ratio not exceeding 0.9% are low in initial sound and good. However, example specimen Nos. 24 and 25 with a low carbide area coefficient of inner and outer races and the carbide area coefficient ratio less than 0.5% lower a little in impression resistance because the hardness of the inner and outer races lowers, thus the initial sound is a little high. Therefore, preferably the carbide area coefficient ratio is 0.5%–0.9%.

On the other hand, the combination effect produced by decreasing the carbides of the inner and outer races does not appear on comparative example specimen Nos. 26–28 with the carbide area coefficient ratio exceeding 0.9%; vibration caused by swell of the inner and outer races grows and the initial sound does not lower.

For comparative example specimen Nos. 29 and 30 comprising rolling elements made of steel species J1 having a high carbide area coefficient containing the C amount exceeding the composition range of the invention although the carbide area coefficient ratio is 0.9% or less, vibration caused by swell of the rolling elements grows and the initial sound does not lower.

Comparative example specimen No. 31 comprises rolling elements made of steel species E1 having a low carbide area coefficient containing the C amount falling below the composition range of the invention and sound is a little decreased because of the combination effect with respect to comparative example specimen No. 28 comprising the inner and outer races and the rolling elements made of steel species E1. However, if parts having a low carbide area coefficient are thus combined, a large effect cannot be produced. Further, when the rolling elements are balls, if low-cost material is used to reduce the cost containing workability, the cost is increased in points of process set change and particularly, foreign material management. Thus, in the invention, use of steel species SUJ2 for the rolling elements becomes optimum.

As we have discussed, to accomplish the third object of the invention, the carbide area coefficient of the inner and outer races is made moderately lower than that of the rolling elements, whereby the "swell" characteristic of the inner and outer races and the rolling elements as a source of vibration and noise of bearings is changed and the low-cost bearings excellent in sound characteristic are provided. The conventional "swell" characteristic depends on the magnitude of simple unevenness and coarseness corresponding to the finished working accuracy on the surfaces of the inner and outer races and the rolling elements. However, in the invention, attention is focused on placement of carbides particularly becoming projections in a delicate uneven shape on the work finished face depending on the carbide amount in the material constitution of the inner and outer races and the rolling elements. The inner and outer races and the rolling elements made of materials different in carbide amount are combined, whereby vibration added to the contact spring force can be damped for improving the sound characteristic.

The invention can be effectively applied not only to bearing parts, but also to other parts coming in rolling contact, rotating, or sliding, such as balls, shafts, and pins, particularly other mechanical parts used in an environment in which corrosion of rust, etc., occurs due to entry of water, etc., and mechanical parts, etc., particularly meeting strict requirements of initial sound and sound degradation. In this case, the members with stricter load conditions are made of a material equivalent to the inner and outer races and the mated members are made of SUJ2. For example, a linear guide device comprising a slider made of a material equivalent to the inner and outer races and rolling elements made of SUJ2, and a linear bearing device such as a ball screw device comprising nuts made of a material equivalent to the inner and outer races and rolling elements made of SUJ2, can be used.

[Effects of the Invention]

As we have discussed, according to the rolling members of the first aspect of the present, the contents of Cr, C, etc., of the compositions causing cost increase in bearing steel are limited, whereby the material and manufacturing costs are reduced as much as possible. The contents of Mn causing breakage and strength degradation and Si causing workability degradation are limited and the DI value defined from the mutual amount relationship among the compositions is also limited at the same time, whereby hardenability and workability are provided and functionability is enhanced without performing carburizing or carbonitriding. Thus, the material and manufacturing costs are reduced as much as possible and the rolling members having higher performance than the rolling members made of conventional bearing steel can be provided.

According to the second aspect of the present invention, a constitution material equivalent to SUJ2 is used for the rolling elements of members of a rolling device. On the other hand, Cr is lowered in the constitution of other members coming in contact with the rolling elements and the matrix Cr content difference therebetween is set to 0.6% or more, whereby a long-life and inexpensive rolling device even in an environment in which corrosion of rust, etc., occurs due to entry of water, etc., can be provided.

Further, according to the third aspect of the present invention, the carbide area coefficient of other members is made moderately lower than that of the rolling elements, whereby the "swell" characteristic of other members and the rolling elements coming in contact therewith and rolling as a source of vibration and noise of bearings is changed and the low-noise, low-vibration, and low-cost bearing devices excellent in sound characteristic can be provided.

While the invention has been described in connection with a preferred embodiment, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. A rolling contact device comprising:

rolling elements of the rolling contact device; and a mated member of the rolling contact device which contacts said rolling elements and is rotated, rolled, slid or moved relative to said rolling elements, in which said mated member is made of carbon steel containing 0.6%–0.9% by weight of C, 0.1%–0.7% by weight of Si, 0.5%–1.1% by weight of Mn, 0.1%–0.6% by weight of Cr and with the remainder, apart from inevitable impurities being Fe, said mated member being subjected to a hardening heat treatment; and said rolling elements of said rolling contact device being made of an alloy steel containing Cr, and said rolling elements being subjected to a hardening heat treatment, wherein at least one of said mated member and rolling elements have an ideal critical diameter DI value calculated by satisfying a following equation in the range of 1.5–4.0 inches (38 to 101 mm), where $$DI=(0.311 \times C\ \%^{0.498}) \times ([0.7 \times Si\ \%]+1) \times ([3.33 \times Mn\ \%]+1) \times ([2.16 \times Cr\ \%]+1).$$

2. A rolling contact device according to claim 1, wherein at least one of said mated member and rolling elements have a retained austenite amount after being subjected to said hardening heat treatment in a range of 8% to 22% by volume.

3. A rolling contact device according to claim 1, wherein at least one of said mated member and rolling elements have a retained austenite amount after being subjected to said hardening heat treatment in a range of 12% to 22% by volume.

4. A rolling contact device according to claim 1, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

5. A rolling contact device according to claim 2, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

6. A rolling contact device according to claim 3, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

7. A rolling contact device comprising:

rolling elements of the rolling contact device; and a mated member of the rolling contact device which contacts said rolling elements and is rotated, rolled, slid or moved relative to said rolling elements, in which said mated member is made of carbon steel containing 0.6%–0.9% by weight of C, 0.1%–0.7% by weight of Si, 0.5%–1.1% by weight of Mn, 0.1%–0.6% by weight of Cr, and with the remainder apart from inevitable impurities being Fe, said mated member being subjected to a hardening heat treatment; and said rolling elements of said rolling contact device being made of an alloy steel containing Cr, and said rolling elements being subjected to a hardening heat treatment, wherein a difference between a matrix Cr content of said rolling elements and a matrix Cr content of said mated member is 0.6% or more.

8. A rolling contact device according to claim 7, wherein at least one of said mated member and rolling elements have an ideal critical diameter DI value calculated by satisfying a following equation in the range of 1.5–4.0 inches (38 to 101 mm), where $$DI = (0.311 \times C\ \%^{0.498}) \times ([0.7 \times Si\ \%] + 1) \times ([3.33 \times Mn\ \%] + 1) \times ([2.16 \times Cr\ \%] + 1).$$

9. A rolling contact device according to claim 7, wherein at least one of said mated member and rolling elements have a retained austenite amount after being subjected to said hardening heat treatment in a range of 8% to 22% by volume.

10. A rolling contact device according to claim 8, wherein at least one of said mated member and rolling elements have a retained austenite amount after being subjected to said hardening heat treatment in a range of 8% to 22% by volume.

11. A rolling contact device according to claim 7, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

12. A rolling contact device according to claim 8, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

13. A rolling contact device according to claim 9, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

14. A rolling contact device according to claim 10, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

15. A rolling contact device comprising:

rolling elements of the rolling contact device; and a mated member of the rolling contact device which contacts said rolling elements and is rotated, rolled, slid or moved relative to said rolling elements, in which said mated member is made of carbon steel containing 0.6%–0.9% by weight of C, 0.1%–0.7% by weight of Si, 0.5%–1.1% by weight of Mn, 0.1%–0.6% by weight of Cr and with the remainder, apart from inevitable impurities being Fe, said mated member being subjected to a hardening heat treatment; and said rolling elements of said rolling contact device being made of an alloy steel containing Cr, and said rolling elements being subjected to a hardening heat treatment, wherein a carbide area coefficient ratio, which is defined by dividing the carbide area coefficient of said mated member by that of the rolling element, is not more than 0.9.

16. A rolling contact device according to claim 15, wherein the rolling elements are made up of 0.95%–1.1% by weight of C, 0.15%–0.35% by weight of Si, 0.1%–0.5% by weight of Mn, and 1.3%–1.6% by weight of Cr, and Fe and inevitable impurity elements in the remaining part.

17. A rolling contact device according to claim 15, wherein at least one of said mated member and said rolling elements has a retained austenite amount after being subjected to said hardened heat treatment in a range from 0.6% to 6% by volume.

* * * * *